United States Patent
Fujiwara

(10) Patent No.: US 10,853,002 B2
(45) Date of Patent: Dec. 1, 2020

(54) FILLING BLANK AREAS ON A PAGE WITH PRINT DATA FOR PRINTING

(71) Applicant: SHARP KABUSHIKI KAISHA, Sakai (JP)

(72) Inventor: Michiko Fujiwara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/788,084

(22) Filed: Feb. 11, 2020

(65) Prior Publication Data

US 2020/0264815 A1 Aug. 20, 2020

(30) Foreign Application Priority Data

Feb. 15, 2019 (JP) .................................. 2019-025578

(51) Int. Cl.
*G06F 3/12* (2006.01)
(52) U.S. Cl.
CPC .......... *G06F 3/1208* (2013.01); *G06F 3/1204* (2013.01); *G06F 3/1242* (2013.01)
(58) Field of Classification Search
CPC ...... G06F 3/1208; G06F 3/1242; G06F 3/125; G06F 3/1251; G06F 3/1252; G06K 15/1885; B26F 1/38
See application file for complete search history.

(56) References Cited

U.S. PATENT DOCUMENTS

2010/0195131 A1 8/2010 Nakata
2019/0212959 A1* 7/2019 Dabon .................. G06F 3/1219

FOREIGN PATENT DOCUMENTS

JP 2010-181971 A 8/2010

* cited by examiner

*Primary Examiner* — Eric A. Rust
(74) *Attorney, Agent, or Firm* — ScienBiziP, P.C.

(57) ABSTRACT

Provided is an image forming apparatus including an operation processor with which a user performs a predetermined input operation, a print information acquirer that acquires print information, a blank area detector that detects a blank area in the acquired print information, a keyword acquirer that acquires a predetermined number of keywords from text information included in the acquired print information, a related candidate information acquirer that acquires related candidate information related to the acquired keywords from a search range preset in predetermined search range information, a related information combiner that generates a combined image in which related information selected using the operation processor from the acquired related candidate information is combined with the blank area of the acquired print information, and a combined image printing processor that prints the generated combined image on a predetermined printing sheet.

16 Claims, 14 Drawing Sheets

SELECT AND DISPLAY ADDITIONAL RELATED INFORMATION

DISPLAY AND CONFIRM COMBINED IMAGE

PRINT COMBINED IMAGE

FILLING BLANK AREAS ON A PAGE WITH PRINT DATA FOR PRINTING

BACKGROUND OF THE INVENTION

Field of the Invention

The present invention relates to an image forming apparatus, and more particularly to an image forming apparatus having a function of printing information related to print information in addition to the print information.

Description of the Background Art

Conventionally, image farming apparatuses have been used, but in recent years, feature-rich multifunction peripherals having a document scanning function, a network connection function, and the like in addition to a document printing function and a duplicating function are used.

In particular, image data scanned by a scanner, information created by a personal computer, and the like, information obtained from a server, and the like, information stored in a universal serial bus (USB) memory, and the like are printed on a sheet specified by a user.

When image data is printed, an editing operation may be applied in which a portion to be printed is left unprocessed and an unnecessary portion is removed before the image data is printed, rather than printing the read image data as is.

For example, in the Japanese Unexamined Patent Application Publication No. 2010-181971 (hereinafter, referred to as Patent Document 1), there is proposed an information processing device according to which when a Web page including a plurality of parts is printed, a user selects a part to be printed from among the parts in the Web page and then drags and drops the selected part on a blank preview image displayed on the display screen, and thus, the part to be printed can be rearranged in the desired layout and printed, and the printing work can be reduced by saving the style sheet in which the desired layout is realized.

However, when the user edits the scanned image data, or when the user rearranges parts in the desired layout using the saved style sheet and then performs printing, the user needs to perform operations including leaving a portion to be printed or dragging and dropping the selected parts after selecting the parts, which made the preparation work before printing a time-consuming operation.

Further, when the user sees the print, result printed on a sheet, the user may determine that a blank space is noticeable, or the arrangement balance of the print result is poor.

In such a case, if the blank area can be filled with some information, the arrangement balance of the print result may be improved, thus bringing the print result closer to an intention of the user.

For example, if the user pastes an image, drawing, and the like separately prepared by the user on the blank area of a print result sheet having the blank area, or fills characters or pictures in the blank area, and then scans and prints the resultant again, the user can obtain a print result in which the blank area is filled.

However, to fill the blank area, the user needs to perform a series of tasks including examining what kind of image, and the like would be appropriate to be added, looking for the image, and the like determined as appropriate, pasting the found image, and the like in the blank area of the print result sheet, and then again scanning and printing the resultant, and therefore, it takes time for the user to prepare a print result with a less blank space and an arrangement balance considered to be appropriate, which increases the work burden of the user.

Therefore, the present invention has been achieved in view of the above-described circumstances, and provides an image forming apparatus by which, if a blank area is present in the print information to be printed, then related information appropriate for filling the blank area is provided to the user, the input work by the user can be simplified, and the time taken can be shortened, which reduces the work burden of the user.

SUMMARY OF THE INVENTION

The present invention provides an image forming apparatus including an operation processor with which a user performs a predetermined input operation, a print information acquirer that acquires print information, a blank area detector that detects a blank area included in the acquired print information, a keyword acquirer that acquires a predetermined number of keywords from text information included in the acquired print information, a related candidate information acquirer that acquires related candidate information related to the acquired keywords from a search range preset in predetermined search range information, a related information combiner that generates a combined image in which related information selected using the operation processor from the acquired related candidate information is combined with the blank area of the acquired print information, and a combined image printing processor that prints the generated combined image on a predetermined printing sheet.

The image forming apparatus further includes a print information analyzer that analyzes the print information and classifies the print information into a character area in which text information is provided and a raster area in which image information is provided, a character recognizer that extracts text information from the image information included in the raster area, and a storage that stores the text information in the character area and the extracted text information as recognized character information.

The keyword acquirer divides the text information included in the recognized character information into words, recognizes a part of speech of each of the words, and acquires noun words, based on the recognized part of speech as keywords.

In addition, the keyword acquirer counts the number of appearances in the print information for each of the acquired keywords, and stores, in the storage, keyword information in which the acquired keyword is associated with the number of appearances.

In addition, if a plurality of the keywords are acquired, the keyword acquirer selects a predetermined number of keywords in the descending order of the number of appearances, and stores the keywords in the storage.

The predetermined number of keywords to be selected is set by the user using the operation processor.

The image processing apparatus further includes a display, and a display screen of the display includes a print confirmation screen displaying the print information and an addition candidate screen displaying the acquired related candidate information, and if an operation of arranging desired related information selected by the user from the related candidate information displayed on the addition candidate screen in the blank area of the print information displayed on the print confirmation screen is performed by the operation processor, the related information combiner generates a combined image in which the selected desired related information is combined with the blank area of the print information.

Moreover, the acquired keywords am displayed on the display so that the user performs editing of the displayed keywords using the operation processor.

Further, the editing of the keywords includes deleting the keywords, changing the keywords, and adding a new keyword.

In addition, a location and device for searching the related candidate information related to the keywords are set in the search range information, and at least one or more devices from an information management device in which a plurality of pieces of information are stored, an information processing device owned by the user, and a storage device is included in the search range information.

Moreover, the search range information is set by the user using the operation processor.

The image forming apparatus further includes an image outputter that outputs the generated combined image, and the image outputter stores the combined image in a predetermined storage medium, or sends the combined image to an information management device in which a plurality of pieces of information are stored.

Moreover, the blank area is an area in which no information is provided, and is an area having a size equal to or larger than a predetermined area dimension.

Further, the print information includes information provided in a document scanned by the image scanning device, information stored in a storage medium, and information sent from the information management device in which a plurality of pieces of information are stored.

In addition, the present invention provides a print information generation method in an image forming apparatus. The method includes acquiring print information by a user predetermined input operation, detecting a blank area included in the acquired print information, acquiring a predetermined number of keywords from text information included in the acquired print information, acquiring related candidate information related to the acquired keywords from a search range preset in predetermined search range information, generating a combined image in which related information selected by a user predetermined input operation from the acquired related candidate information is combined with the blank area of the acquired print information, and printing the generated combined image on a predetermined printing sheet.

Moreover, the present invention provides a print information generation method in an image forming apparatus. The method includes acquiring print information by a user predetermined input operation, displaying the acquired print information on a print confirmation screen, detecting a blank area included in the acquired print information, acquiring a predetermined number of keywords from text information included in the acquired print information, acquiring related candidate information related to the acquired keywords from a search range preset in predetermined search range information, displaying the acquired related candidate information on an addition candidate screen, and, upon selecting desired related information by the user from the displayed related candidate information and performing an operation of arranging the selected related candidate information in the blank area of the print information displayed on the print confirmation screen, generating a combined image in which the selected related information is combined with the blank area of the acquired print information, and printing the generated combined image on a predetermined printing sheet.

According to the present invention, an image forming apparatus includes a blank area detector that detects a blank area included in acquired print information, a keyword acquirer that acquires a predetermined number of keywords from text information included in the acquired print information, a related candidate information acquirer that acquires related candidate information related to the acquired keywords from the search range preset in predetermined search range information, and a related information combiner that generates a combined image in which related information selected from the acquired related candidate information is combined with the blank area of the acquired print information, and thus, if a blank area exists in the acquired print information, appropriate related candidate information related to the print information can be provided to the user, because of which the input work by the user when generating print information in which related information is combined with the blank area can be simplified and the time taken can be shortened, and thus, the work burden of the user can be reduced.

DESCRIPTION OF THE PREFERRED EMBODIMENTS

Below, embodiments of the present invention will be described using the drawings. It is noted that the present invention shall not be limited in any way by the description of embodiments below.

Configuration of Image Forming Apparatus

Figure 1:
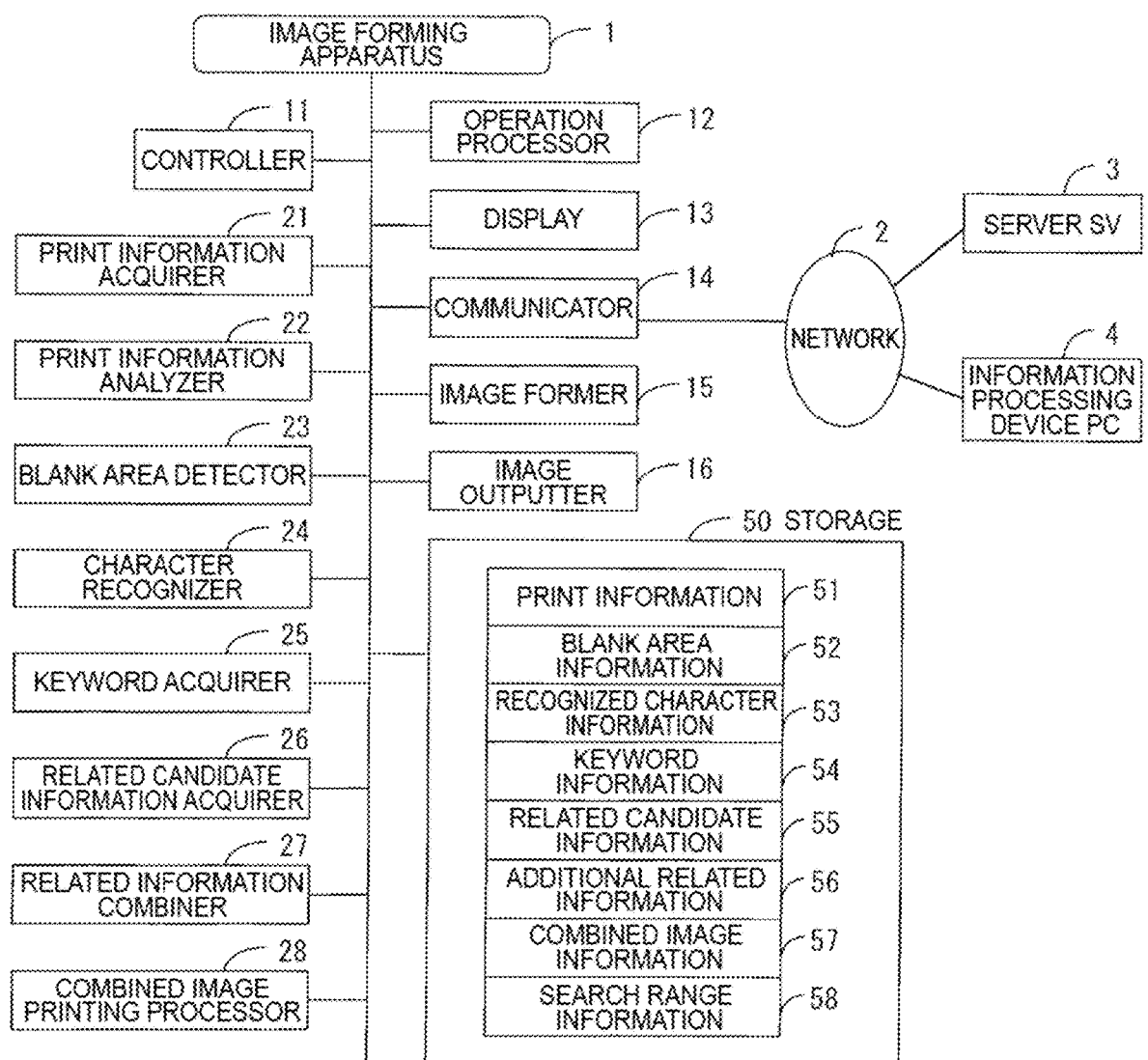
FIG. 1 is a block diagram illustrating a configuration in an embodiment of an image forming apparatus according to the present invention.

FIG. 1 is a block diagram illustrating a configuration in an embodiment of an image forming apparatus according to the present invention.

An image forming apparatus (hereinafter, also referred to as multifunction peripheral (MFP)) 1 is an apparatus for processing image data, and for example, is an electronic equipment having a copying function, a printing function, a document scanning function (scanning function), a document editing function, a facsimile (FAX) function, and a communication function.

In the present invention, in particular, the image forming apparatus 1 can be connected to a network 2 and can intercommunicate with a server (SV) 3 and an information processing device (PC) 4 such as a personal computer via the net work 2 such as local area network (LAN).

The server (SV) 3 is an information management device in which a plurality of pieces of information such as various image data and documents are stored, and is a device for providing print information that can be printed by the image forming apparatus.

The information processing device (PC) 4 corresponds to a personal computer, a tablet device, a portable terminal, or the like owned by a user, and is a device for providing print information that can be printed by the image forming apparatus.

As will be described later, the server (SV) 3 and the information processing device (PC) 4 are included in a search range for acquiring related candidate information, and information stored in advance in the server (SV) 3 and in the information processing device (PC) 4 is the related candidate information.

In FIG. 1, the image forming apparatus (MFP) 1 according to the present invention mainly includes a controller 11, an operation processor 12, a display 13, a communicator 14, an image former 15, an image outputter 16, a print information acquirer 21, a print information analyzer 22, a blank area detector 23, a character recognizer 24, a keyword acquirer 25, a related candidate information acquirer 26, a related information combiner 27, a combined image printing processor 28, and a storage 50.

The controller 11 is a component for controlling the operation of each component such as the operation processor and the print information acquirer, and is mainly realized by a microcomputer including a central processing unit (CPU), a read-only memory (ROM), a random-access memory (RAM), an input/output (I/O) controller, a timer, and the like.

The CPU organically operates various hardware based on a control program stored in advance in the ROM or the like, and executes a communication function, a print information acquisition function, a related candidate information acquisition function, and the like according to the present invention.

Among the components described above, the print information acquirer 21, the print information analyzer 22, the blank area detector 23, the character recognizer 24, the keyword acquirer 25, the related candidate information acquirer 26, and the related information combiner 27 are function blocks the processing of each of which is executed by the CPU based on a predetermined program.

The operation processor 12 is an input device for the user of the image forming apparatus to perform a predetermined input operation. For example, the operation processor 12 is a component for inputting information such as characters and for selecting and inputting a function, and a keyboard, mouse, touch panel, and the like is used in the operation processor 12.

In the present, invention, in particular, the user who intends to perform printing work performs a predetermined input operation using a touch panel or the like to enter a keyword, and select and input the related candidate information, and the like The display 13 is a component for displaying information, displaying information necessary for executing each of the functions, and the execution results of the function, and the like to notify the user. For example, if a liquid crystal display (LCD), an organic electroluminescence (EL) display, or the like is employed and a touch panel Is employed as the operation processor 12, the display and the touch panel are arranged to overlap each other.

The display screen of the display 13 may be divided into a plurality of areas, and different information may be displayed in each area of the display screen.

For example, as will be described later, a print editing screen including a print confirmation screen, a keyword screen, a search range screen, an addition candidate screen, and the like is displayed on the display screen of the display.

The print confirmation screen displays print information, and a combined image obtained by combining print information and related information.

The addition candidate screen displays the acquired related candidate information.

Further, information necessary for executing the printing function and document scanning function of the image forming apparatus, setting items necessary for printing, and the like are displayed on the display 13 using characters, symbols, images, icons, and the like.

The communicator 14 is a component for communicating with the server SV and other information processing devices PC via the network 2. For example, the communicator 14 receives print information from the server SV or the information processing device personal computer (PC).

Further, the communicator 14 sends the combined image printed by the image forming apparatus to the information processing device PC.

LAN, wide area network (WAN) such as the Internet, and other dedicated lines are used as the network.

The image former 15 is a component for forming information on a recording medium, for example, if image data is to be printed on a recording medium, the image former 15 generally performs each process for charging, exposure, development, transfer, cleaning, electricity removal and fixing in continuation, and forms the image data on the recording medium.

In the development process, toner Is supplied from a toner cartridge to a developing device, the electrostatic latent image formed on the surface of a charged photoreceptor drum is developed, and a toner image corresponding to the electrostatic latent image is formed. The toner image formed on the surface of the photoreceptor drum is transferred onto the recording medium by a transfer device, and is then fixed on the recording medium by being heated by a fixing device.

The image outputter 16 is a component for outputting the formed image data, and as will be described later, outputs a combined image generated by the related information combiner.

The image outputter 16 corresponds to, for example, a printer, and prints print information on a predetermined printing sheet (paper medium).

However, the output of the image data is not limited to printing, and includes, for example, storing a generated combined image into a predetermined storage medium such as a USB memory, or transmitting the image to an information management device (server) in which a plurality of pieces of information are stored, or another information processing device via a network such as the Internet.

The print information acquirer 21 is a component for acquiring print information, and inputs information of a document, and the like on which images, characters, graphics, and the like are provided.

A scanner (image scanning device) that scans documents on which predetermined information is printed is used, for example, as the print information acquirer 21, and a document on which the print information is provided is scanned by the scanner, and the print information converted into electronic data is stored into the storage 50.

In the print information scanned by the scanner, text information such as characters included in the original document is also stored as image information. Text information stored as image information is extracted as text information by performing character recognition, anti keywords are acquired from the extracted text information.

In principle, the print information is information acquired for the purpose of printing.

For example, the print information includes information provided in a document scanned by the image scanning device, information stored in a storage medium, and information sent from an information management device in which a plurality of pieces of information are stored.

However, even information acquired for the purpose of printing not only may be printed but also may be stored in a storage medium such as a USB memory, a hard disk, and the like or sent to an information management device (server SV) or information processing device PC.

In the present invention, in addition to the information acquired for the purpose of printing, the print information includes information acquired for the purpose of storing in the storage medium, or information acquired for the purpose of sending to an information management device, etc. via a network.

In addition to scanning a document by a scanner, there are various other methods of acquiring print information.

For example, an interface connecting an external storage medium such as a USB memory corresponds to the print information acquirer.

An electronic data file of image information to be printed, and the like may be saved in an external storage medium such as a USB memory, the USB memory, and the like may be connected to an input interface such as a USB terminal, and a predetermined input operation may be performed in the operation processor 12 to read the desired electronic data file saved in the USB memory, and the like, and store the electronic data file in the storage 60 as print information.

In this case, text information such as characters included in the electronic data file is stored as text information itself and keywords are directly acquired from the text information.

In addition, a connection may be established with an information processing device PC such as a personal computer or a server SV in which image information is stored in advance via the network 2 such as the Internet, and image information and documents, and the like may be received by data communication, and then stored in the storage 50 as print information.

Furthermore, a sheet on which the information to be printed is provided may be photographed by a camera having a communication function, a connection may be established to the camera by wireless communication, and the information photographed by the camera may be received and then stored in the storage 50 as print information.

The print information analyzer 22 is a component for analyzing the acquired print information, and mainly classifies the print information into a character area in which text information is provided and a raster area in which image information is provided.

The character area is an area in which text information sixth as characters, symbols, and numbers is provided, and the characters or the like are directly acquired and stored as text information such as characters. This text information may be stored along with information of the size and color of characters, and the like. The character area can be detected, for example, by analyzing data in a page description language.

The raster area is an area in which images, graphics, and photographs are provided, and is an area in which text information such as characters, numbers, and symbols is further included as image data.

The raster area can be detected, for example, by analyzing data in a page description language.

The text information included in the raster area is image data and cannot be handled as is in the form of characters, and thus, the text information is extracted as text information after character recognition is performed.

If print information is expressed in two-dimensional coordinates, the character area and the raster area are stored as coordinate values in the two-dimensional coordinates.

The blank area detector 23 is a component for detecting a blank area included in the acquired print information.

The blank area is an area in which information such as characters and images is not provided in the acquired print information, and has a size equal to or larger than a predetermined area dimension consisting only of white pixels. If it is assumed that in the acquired print information, an area in which valid information exists includes the character area and the raster area described above, then the blank area is mainly an area excluding the character area and the raster area.

However, in the print information, many blank parts exist even between characters, and the like, but in the present invention, the blank area implies an area having a size equal to or larger than a predetermined area dimension in which related candidate information described later can be added.

The blank area may be detected by extracting an area having a predetermined area dimension or more including only white pixels. For example, if the area dimension of an area to be detected as a blank area (for example, 5 cm in length×5 cm in width) is set in advance, all pixels starting from the pixel at one end of the print information are checked one by one in a sequence to confirm if the pixels are white pixels, and an area having the area dimension described above and including only white pixels is found to exist after all the pixels of the print information are scanned, the area is determined as the blank area.

The blank area is also represented by coordinate values in the two-dimensional coordinates of the print information, and is stored in the storage 50 as blank area information 52.

The character recognizer 24 is a component for extracting text information from the image information included in the raster area detected as described above.

As described above, text information such as characters and numbers is stored as image data in the raster area, and character recognition is performed on the image data to extract text information such as characters, and the like That is, similarly to the prior art, the character recognition process for extracting characters, and the like from image data is performed, and text information such as characters is acquired.

The above-described text information in the character area and the text information extracted by character recognition are stored in the storage 50 as recognized character information 53.

Moreover, if the character recognition process is performed, the size and color of the recognized characters may be also recognized, and the acquired text information may be stored along with the size and color of the characters, and the like The keyword acquirer 25 is a component for acquiring a predetermined number of keywords from the text information included in the acquired print information.

If the acquired print information includes the character area and the raster area, the keywords are acquired from the text information included in the character area and the text information acquired from the raster area.

For example, many predetermined words are stored in advance in the storage, and if words matching the stored words exist in the text information described above, the words are acquired as keywords.

Alternatively, the text information included in the recognized character information is divided into words, the part of speech of each of the words is recognized, for example, only noun words are extracted from the recognized parts of speech, and the noun words are acquired as keywords.

Moreover, since the same keyword may appear multiple times in the text information, the keyword acquirer 25 counts the number of times that the keyword appeared in the print information (the number of appearances) for each acquired keyword.

The acquired keywords are associated with the number of times the keywords appear (the number of appearances) and stored as keyword information 54 in the storage 50.

It is believed that a keyword having a large number of appearances is closely related to the print information and is highly likely to be an important keyword for the print information.

Therefore, if a keyword is selected from the viewpoint of adding information that, is as closely related to print information as possible to the blank area, it is preferable to select a keyword having a large number of appearances, and therefore, the number of appearances is also stored.

If a plurality of keywords are acquired, a predetermined number of keywords may be selected in descending order of the number of appearances, and stored in the storage 50.

The predetermined number of keywords to be selected may be a numerical value set in advance in a fixed manner, or the user may be able to set an arbitrary numerical value using the operation processor 12.

Moreover, in some cases, the acquired keywords may not be appropriate, or the user may want to set a keyword.

Therefore, the acquired keywords may be displayed on the display 13 and the user may edit the displayed keywords using the operation processor 12.

The editing the displayed keywords includes deleting the keywords, changing the keywords, and adding a new keyword.

The related candidate information acquirer 26 is a component for acquiring related candidate information related to the acquired keywords from a search range preset in predetermined search range information.

If the stored keyword information includes only one keyword, the related candidate information related to the one keyword is searched from the predetermined search range information.

If the keyword information includes a plurality of keywords, a predetermined number (for example, three) of keywords are selected in descending order of the number of appearances associated with the keywords.

Information related to each of the selected predetermined number of keywords is searched from the predetermined search range information.

The predetermined search range information is information indicating a search range to be searched for the related candidate information, and a location and device for searching the related candidate information related to the keywords are set in the search range information.

The search range information includes, for example, at least one or more devices of an information management device (server SV) that stores a plurality of pieces of information, an information processing device PC owned by the user, and a storage device.

Furthermore, a storage location (for example, a folder name) where a WEB server specified by the user (hereinafter, also simply referred to as WEB) from among several WEB servers connected to the Internet, the image file, or the like specified by the user exists may also be set to be the search range information.

To enable an easy connection to the server SV, the information processing device PC, the WEB server, and the like, internet protocol (IP) addresses, URLs, folder and file names, or the like that identify these devices are stored as information set to be the search range information.

The search range information may be stored in advance in the storage 50 in a fixed manner, but the user may also be able to change the setting using the operation processor 12.

For example, if three keywords are selected and a server is selected as the search range information, the related candidate information acquirer 26 sends the three keywords to the server.

Upon receiving the three keywords, the server searches information stored in the server, extracts information such as characters and images including the file names or identification information matching each of the three keywords, sends the extracted information to the image forming apparatus that had sent the keywords, and the related candidate information acquirer 26 of the image forming apparatus acquires the sent information as the related candidate information.

As will be described later, the acquired related candidate information is displayed on the addition candidate screen of the display screen. The related information to be added to the print, information is selected by the user selecting and entering desired related candidate information from the acquired and displayed related candidate information.

The user may also specify a position where the related information to be added is arranged in the blank area.

The related information combiner 27 is a component for combining the selected related information with the print information.

Here, a combined image is generated by combining the related information selected using the operation processor 12 from the acquired related candidate information with the blank area of the acquired print information.

For example, if an operation of arranging the desired related information selected by the user from the related candidate information displayed on the addition candidate screen of the display 13 in the blank area of the print information displayed on the print confirmation screen of the display 13 is performed by the operation processor 12, the related information combiner 27 generates a combined image by combining the selected desired related information with the blank area of the print information.

The combined image printing processor 28 is a component for printing the generated combined image on a predetermined printing sheet.

As a result, the image information obtained by combining the related information is printed in the blank area in the original print information.

However, the generated combined image is not only printed on a printing sheet, but may be stored in another storage medium such as a USB memory or may be sent to a server or an information processing device via the network 2.

The storage 50 is a component for storing information and programs necessary for executing each of the functions of the image processing device according to the present invention, and a semiconductor storage element such as a ROM, a RAM and a flash memory, a storage device such as an hard disk drive (HDD), and an SSD, or another storage medium may be employed.

The storage 50 stores, for example, print information 51, blank area information 52, recognized character information 53, keyword information 54, related candidate information 55, additional related information 56, combined image information 57, and search range information 58.

The print information 51 is information acquired by the print information acquirer 21, and is mainly information to be printed on a printing sheet.

As described above, information scanned by the scanner, information stored in the storage medium, information stored in the server, and the like correspond to the print information 51.

Figure 2A:
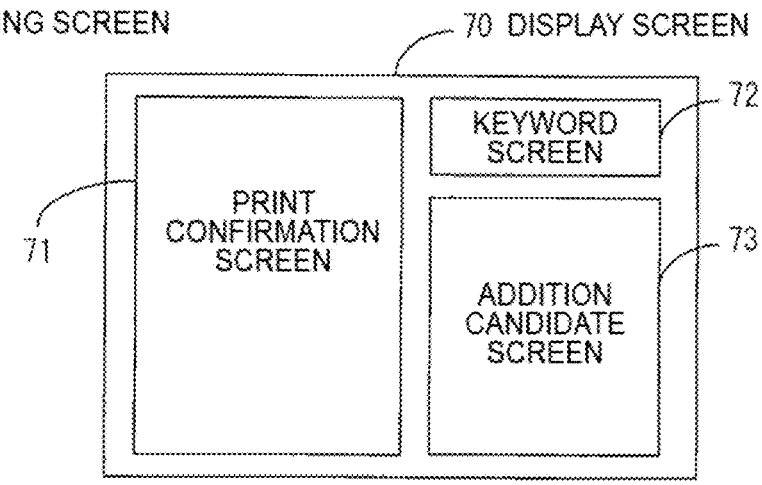
FIG. 2A and FIG. 2B are explanatory diagrams of an embodiment of a print editing screen displayed on a display according to the present invention.
Figure 2B:
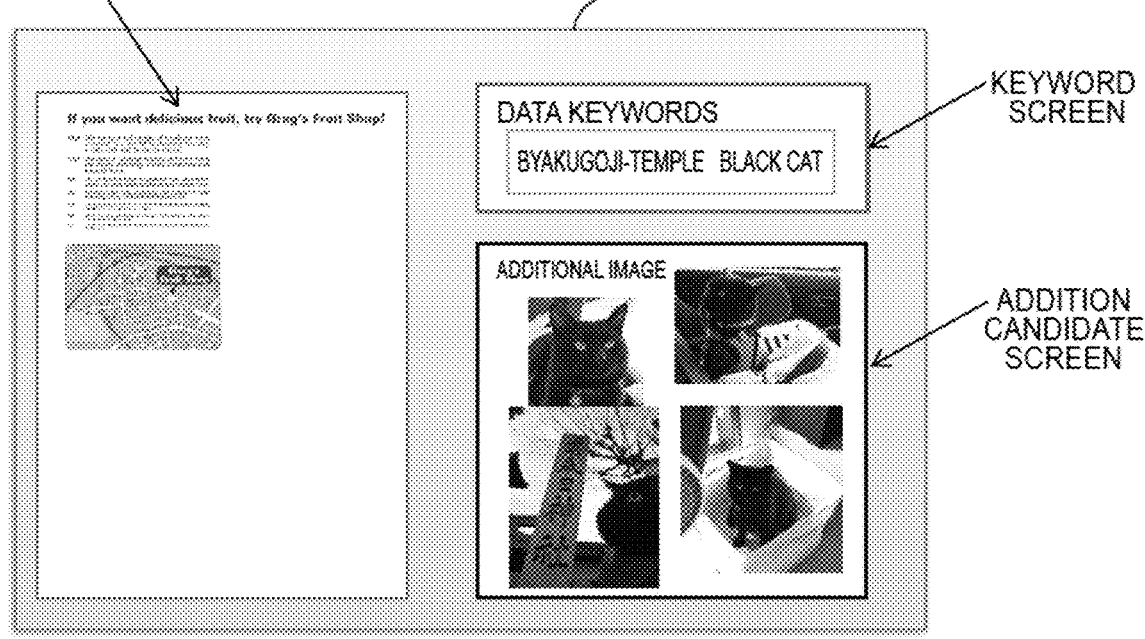

The print information 51 is displayed on a print confirmation screen 71 as illustrated in FIGS. 2A and 2B and the like.

The blank area information 52 is information regarding a blank area in which no character or the like is provided, and is information indicating the position of a blank area included in the acquired print information 51.

As described above, after the raster area and the character area of the print information 51 are detected by the print information analyzer 22, the blank area detector 23 detects a blank area in which no character or the like is provided, and stores the blank area information 52 in the storage 50.

The recognized character information 53 is text information such as characters recognized by the character recognizer 24, and includes text information provided in the character area of the print information.

The recognized text information is used to acquire keywords.

The keyword information 54 is the keywords acquired from the text information, and the number of appearances of the keywords is also associated and stored.

Among the acquired keywords, keywords having a large number of appearances are displayed on the keyword screen 72 of the display screen.

The related candidate information 55 is information acquired by the related candidate information acquirer 26.

The acquired related candidate information 55 is displayed on the addition candidate screen 73 of the display screen.

The additional related information 56 is information selected by the user from the related candidate information 55 and added to the print information (also referred to as related information).

The additional related information 56 is displayed on the print confirmation screen 71 of the display screen.

The combined image information 57 is information obtained by combining the print information 51 and the additional related information 56.

The combined image information 57 corresponds to the information displayed on the print confirmation screen 71 of the display screen after the user performs an operation of adding the additional related information 56 to the print information 51.

The search range information 58 is information indicating a range from which to acquire the related candidate information 55.

For example, the search range information 58 is information specifying an address of the server, an address of the information processing device, a world wide web uniform resource locator (WEB URL), a storage device connected to the image forming apparatus, and the like.

The search range for acquiring the related candidate information 55 may be set and stored in advance in a fixed manner.

Alternatively, a desired search range may be selected or designated by the user.

If a server or an information processing device is to be set as a search range, a folder set in the server or the information processing apparatus may be further selected.

Further, the search range is not limited to one, and two or more search ranges, such as a server and WEB may be set.

In addition, not only the search range but also detailed search conditions may be set and input. For example, the detailed search conditions may include searching for a file included in a folder completely matching a selected keyword, and searching for a file having a file name including a selected keyword.

In addition, the detailed search conditions may include searching for an image including identification information matching a selected keyword, and searching for a document, including a selected keyword or a photograph in which a selected keyword is shot.

Alternatively, a URL of a WEB page related to a selected keyword, a photograph, video, or audio information included in the Web page, and the like may also be set to lie included in the search range.

Print Editing Screen Displayed on the Display

Here, an embodiment of a display screen displaying information necessary for adding related information to a blank area if the print information has the blank area will be described.

The arrangement, size, and the like of each screen displayed on the display screen are not limited to those illustrated below.

First Embodiment of Print Editing Screen

FIGS. 2A and 2B illustrate explanatory diagrams of an embodiment of a print editing screen displayed on the display.

A print editing screen divided into several areas is displayed on the display screen 70 of the display 13.

For example, as illustrated in FIG. 2A, the print editing screen includes the print confirmation screen 71, the keyword screen 72, and the addition candidate screen 73. The arrangement and size of each of the screens included in the print editing screen may be changeable by the user.

The print confirmation screen 71 is a screen for visually confirming information printed on a printing sheet. The acquired print information is displayed on the print confirmation screen 71.

Although not illustrated if a key for executing printing is input an image displayed on the print confirmation screen 71 is printed on the printing sheet.

FIG. 2B illustrates a specific example of the print editing screen.

The print confirmation screen 71 in FIG. 2B illustrates a state in which print information including character information and images is displayed.

The keyword screen 72 is a screen for displaying a keyword acquired by the keyword acquirer 25.

If there are a plurality of acquired keywords, several keywords are displayed in descending order of the number of appearances.

The keyword screen 72 in FIG. 2B illustrates a state in which two keywords ("BYAKUGOJI-TEMPLE" and "BLACK CAT") are displayed.

In a state where such keywords are displayed, if the user performs an input operation on a key implying tire start of a search (not illustrated), search for the related candidate information 55 is started using the keywords.

If there are a large number of acquired keywords, and all the acquired keywords cannot be displayed on the keyword screen 72, the number of keywords that, can be displayed are displayed, and thereafter, for example, the remaining number of keywords may be sequentially displayed by performing a scroll operation, and the like While the keyword is text information acquired from the print information, the user may edit, the displayed keyword.

For example, the user may delete or change the displayed keyword, or may add a new keyword, by the operation processor 12.

After editing the keyword, the user may restart the search for the related candidate information 55 by entering a search start key.

If the search is performed using a plurality of keywords, it may be possible to set whether to search for information related to all of the plurality of keywords, or to search for all information related to any one of the keywords.

Furthermore, the user may be able to select or input detailed search conditions, such as whether to search for an image and a photograph including the keyword, or to search for a document including the keyword.

The addition candidate screen 73 is a screen for displaying the related candidate information 55 acquired by the related candidate information acquirer 26.

The related candidate information 55 displayed on the addition candidate screen 73 is information related to a keyword found by searching a predetermined search range.

The addition candidate screen 73 in FIG. 2B illustrates a state in which the related candidate information 55 including four photographs is displayed.

In FIG. 2B, photographs related to each of the two keywords ("BYAKUGOJI-TEMPLE" and "BLACK CAT") are displayed. The user selects information to be added to the print information while viewing the related candidate information 55.

Second Embodiment of Print Editing Screen

Figure 3A:
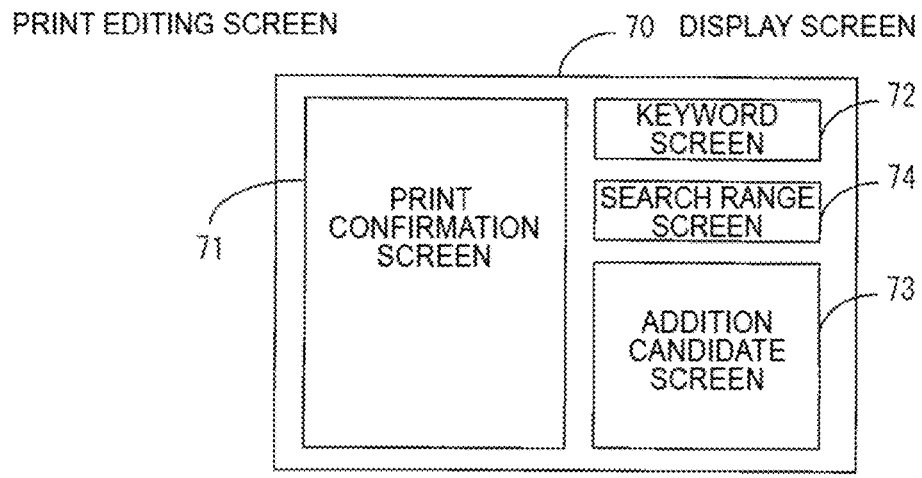
FIG. 3A and FIG. 3B are explanatory diagrams of an embodiment of a print editing screen displayed on the display according to the present invention.
Figure 3B:
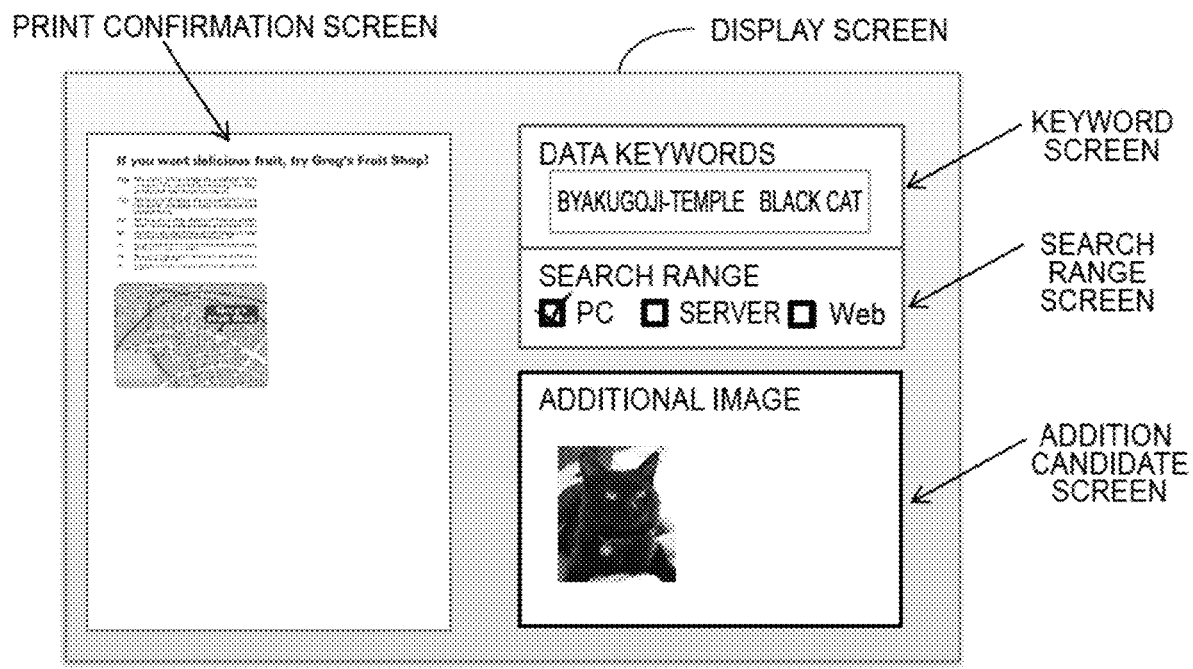

FIGS. 3A and 3B are explanatory diagrams of an embodiment of the print editing screen displayed on the display.

Here, the print editing screen in which a search range screen 74 is added to the print editing screen in FIG. 2A is illustrated.

The search range screen 74 is a screen displaying the search range of the related candidate information 55, and is also a screen for setting and entering the search range.

As illustrated in FIG. 3A, the search range screen 74 is displayed below the keyword screen 72, for example.

The search range screen 74 in FIG. 3B illustrates three search ranges (PC, server, WEB).

A plurality of selectable search ranges are displayed on the search range screen 74, and a check box indicating whether or not the search range has been selected is displayed for each of the search ranges.

If the user checks a checkbox of the desired search range, the search range is selected, and if the user unchecks the checkbox, the search range is unselected.

FIG. 3B illustrates a state in which the information processing device PC is selected as the search range.

The search range that can be selected is not limited to one, and for example, all three search ranges may be selected. In this case, if the user selects and inputs a keyword and a search range, and then performs an input operation on a key implying the start of a search, search for the related candidate information 55 is started.

It is noted that it may be possible to set whether or not to display the search range screen 74 itself.

If the user makes the setting to display the search range screen 74, the search range screen 74 is displayed.

Example 3 of Print Editing Screen

Figure 4A:
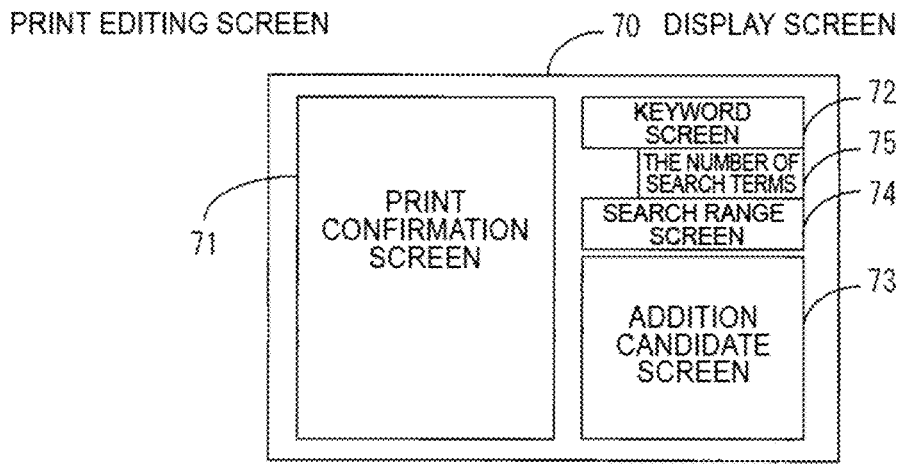
FIG. 4A and FIG. 4B are explanatory diagrams of an embodiment of a print editing screen displayed on the display according to the present invention.
Figure 4B:
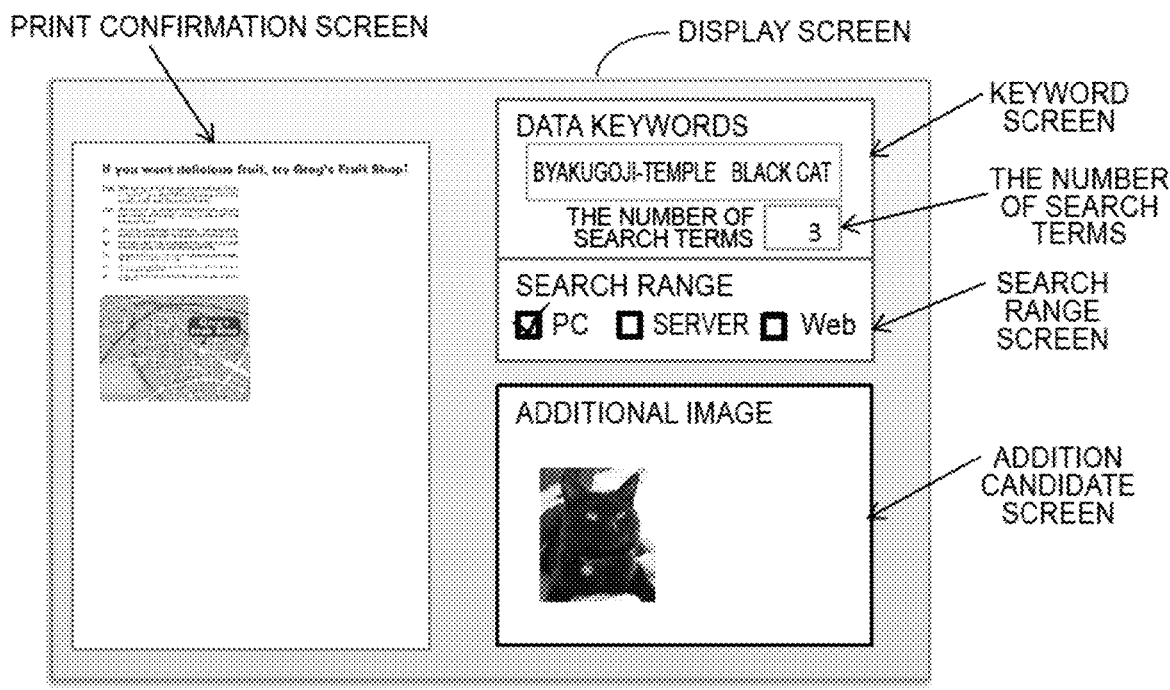

FIGS. 4A and 4B are explanatory diagrams of an embodiment of the print editing screen displayed on the display.

Here, as illustrated in FIG. 4A, a print editing screen in which the number of search words 75 is added to the print editing screen in FIG. 3A is illustrated.

The number of search words 75 is the number of keywords used for searching the related candidate information from the acquired keyword information.

An initial value may be set in advance for the number of search words 75, and thereafter, the number of search words 75 may be freely set and changed by the user.

If the number of search words 75 is increased, a large number of related candidates can be searched, and the number of candidates that the user can select can be increased. However, if a large number of related candidates are displayed on the addition candidate screen, selection of a candidate takes time.

If too many related candidates are found, a smaller number may be entered in the number of search words 75 to reduce the number of related candidates, and search maybe performed again.

Figure 5A:
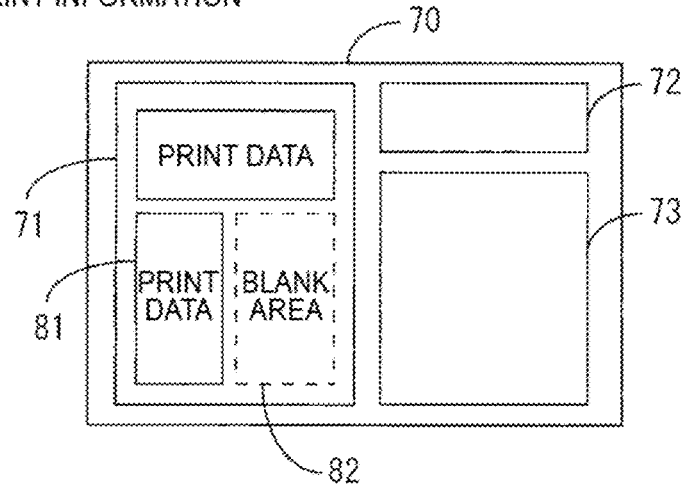
FIG. 5A, FIG. 5B, and FIG. 5C are explanatory diagrams of an embodiment of a display screen after acquiring the print information until the related candidate information is acquired in the present invention.
Figure 5B:
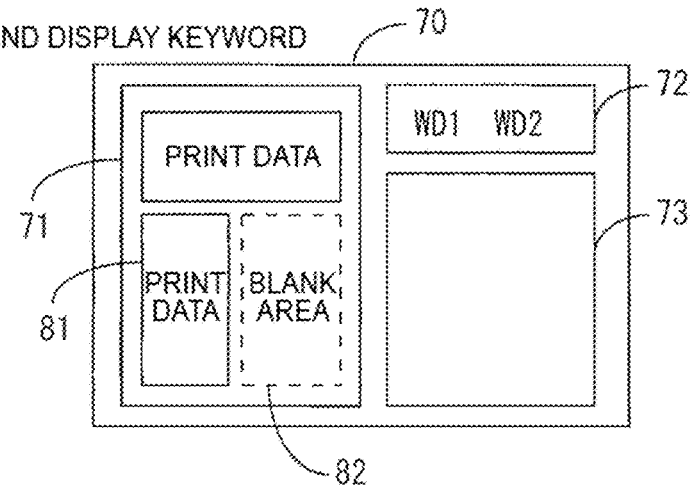
Figure 5C:
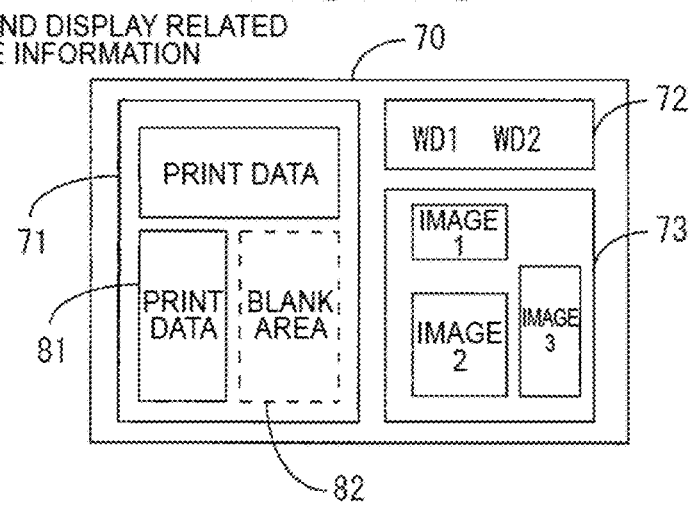

Description of Information Displayed on Display After Acquiring Print Information FIGS. 5A to 5C illustrate explanatory diagrams of an embodiment of a display screen after acquiring the print information until the related candidate information is acquired.

FIG. 5A illustrates an embodiment of a display screen when print information is acquired.

FIG. 5A is a display screen in which the three screens are arranged as illustrated in FIGS. 2A and 2B.

FIG. 5A illustrates a state in which the acquired print information 51 is displayed on the print confirmation screen 71. Two areas of the print data 81 and a blank area 82 exist in the acquired print information 51.

Figure 7A:
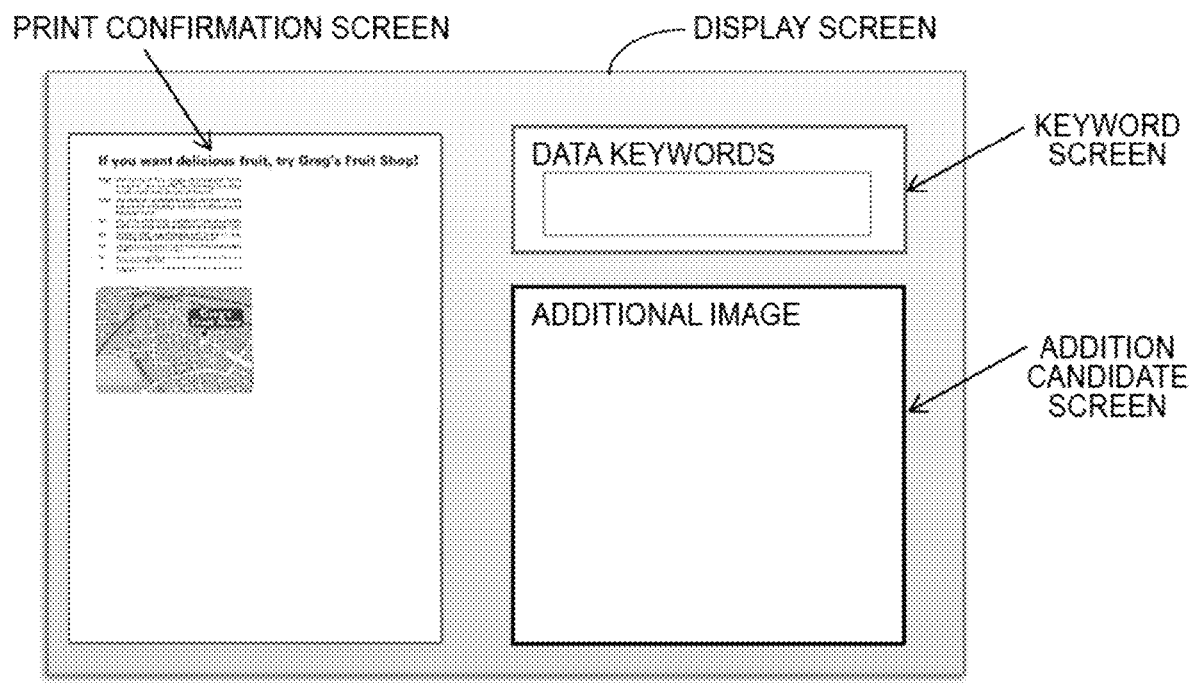
FIG. 7A and FIG. 7B are explanatory diagrams of an embodiment of a state in which acquired print information is displayed on a print confirmation screen and a state in which acquired keywords are displayed on a keyword screen.

FIG. 7A illustrates an embodiment of a specific display screen corresponding to FIG. 5A.

The detection process for the blank area may be performed automatically after the print information is acquired, or the detection process for the blank area may be performed if an input operation implying the start of the search for a blank area is performed by the user.

As illustrated in FIG. 5A, if the blank area 82 is detected in the print information, the information included in the print data 81 is analyzed to acquire a keyword.

FIG. 5B illustrates an embodiment of a display screen when the keyword information 54 is acquired.

FIG. 5B illustrates a state in which the acquired keywords (WD1, WD2) are displayed on the keyword screen 72.

Figure 7B:
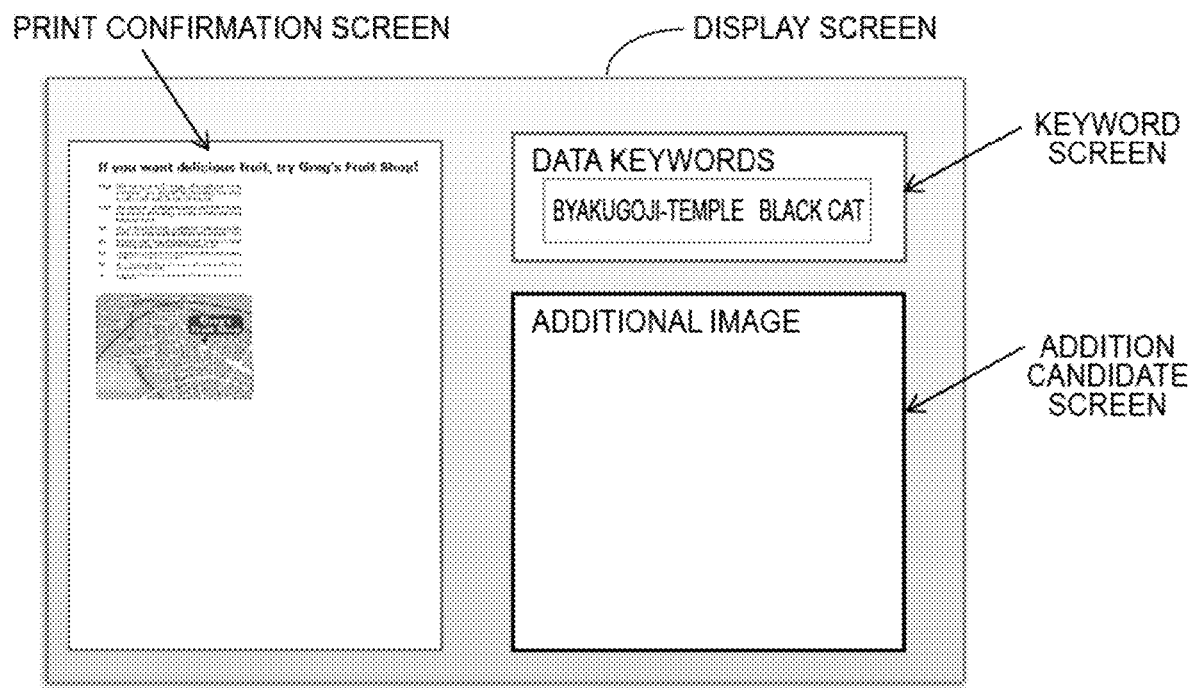

FIG. 7B illustrates an embodiment of a specific display screen corresponding to FIG. 5B.

The user checks the keyword displayed on the keyword screen 72, and if the keyword is appropriate, the user executes the process for searching the related candidate information using the displayed keyword by performing a predetermined input operation.

Alternatively, if the displayed keyword is not appropriate, the user may edit the keyword by performing an input operation for deleting or changing the keyword, or adding a keyword. In this case, a process for searching related candidate information using the edited keyword is executed.

In this search process, the search range set in the search range information 58 is searched for information related to the keyword, and the related candidate information 55 is acquired.

FIG. 5C illustrates an embodiment of a display screen when the related candidate information 55 is acquired.

FIG. 5C illustrates a state in which the acquired related candidate information 55 (an image 1, an image 2, and an image 3) is displayed on the addition candidate screen 73.

Figure 8A:
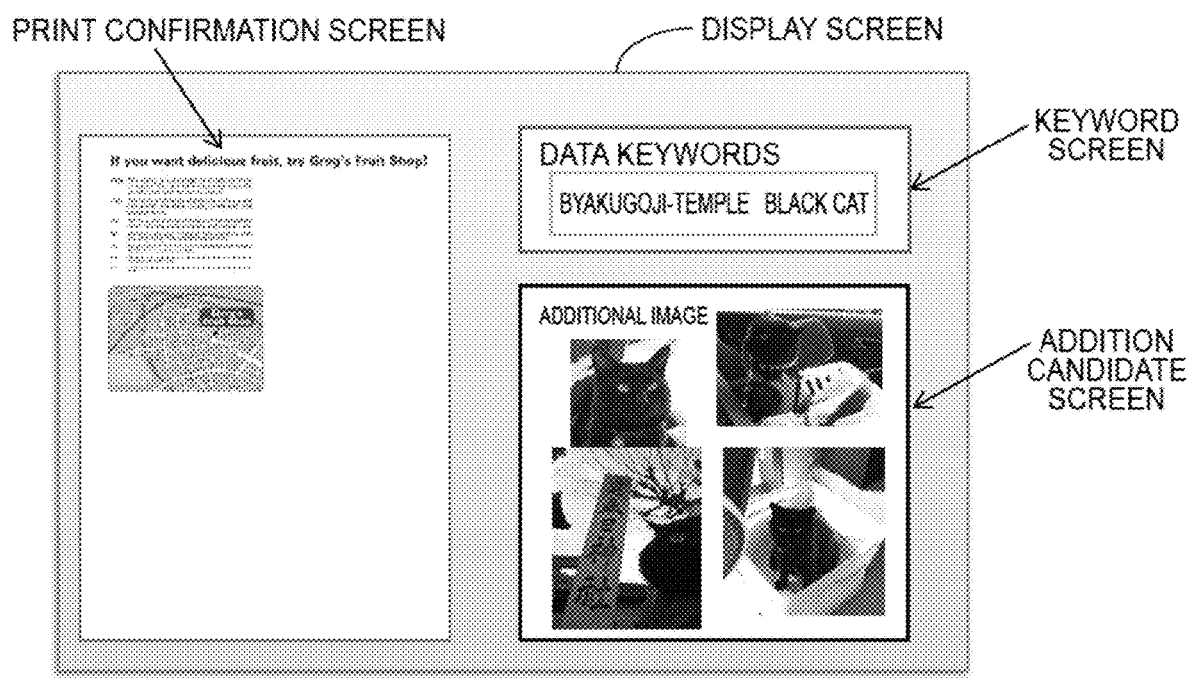
FIG. 8A and FIG. 8B are explanatory diagrams of an embodiment of a state in which acquired related candidate information is displayed on an addition candidate screen and a state in which selected related information is displayed on the print confirmation screen.

FIG. 8A illustrates an embodiment of a specific display screen corresponding to FIG. 5C.

The user checks the related candidate information 55 displayed on the addition candidate screen 73, and selects the information (additional related information) to be added to the blank area 82 of the print information from the related candidate information (the image 1, the image 2, and the image 3).

For example, the user may select a desired image from the images displayed on the addition candidate screen 73 by the operation processor 12, and perform an input operation for moving the selected image to a desired location in the blank area 82 of the print confirmation screen 71.

Figure 6A:
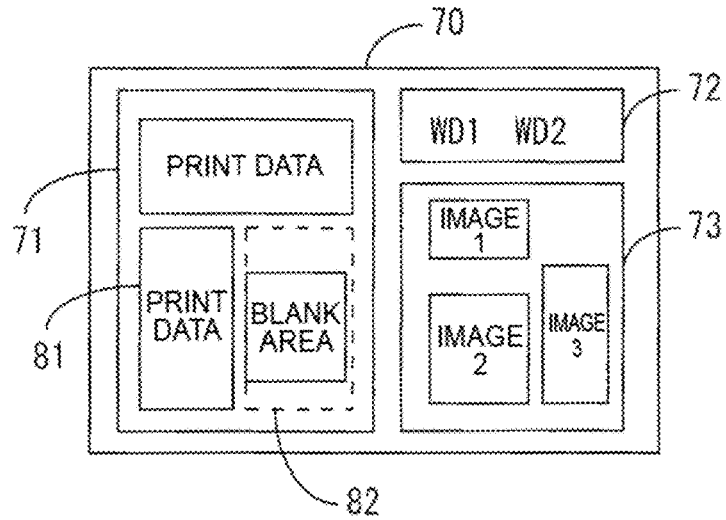
FIG. 6A, FIG. 6B, and FIG. 6C are explanatory diagrams of an embodiment of a display screen after selecting the related information to be added until an image including the related information to be added is printed in the present, invention.
Figure 6B:
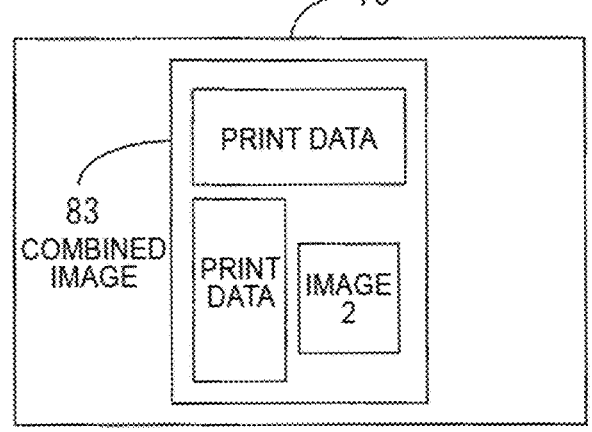
Figure 6C:
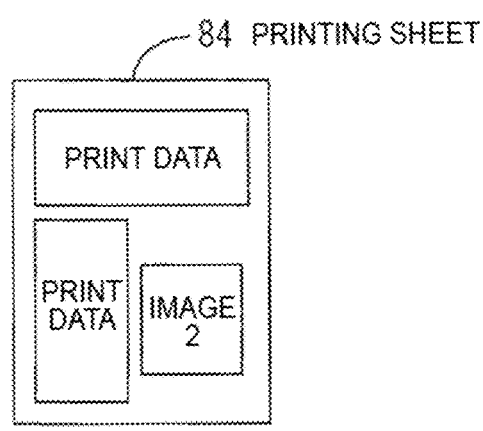

FIGS. 6A to 6C illustrate explanatory diagrams of an embodiment of a display screen after selecting the related information to be added until an image including the related information to be added is printed.

FIG. 6A illustrates an embodiment of a display screen when the additional related information 56 is selected.

FIG. 6A illustrates a state in which the selected additional related information 56 (image 2) is displayed in the blank area 82 of the print confirmation screen 71.

Figure 8B:
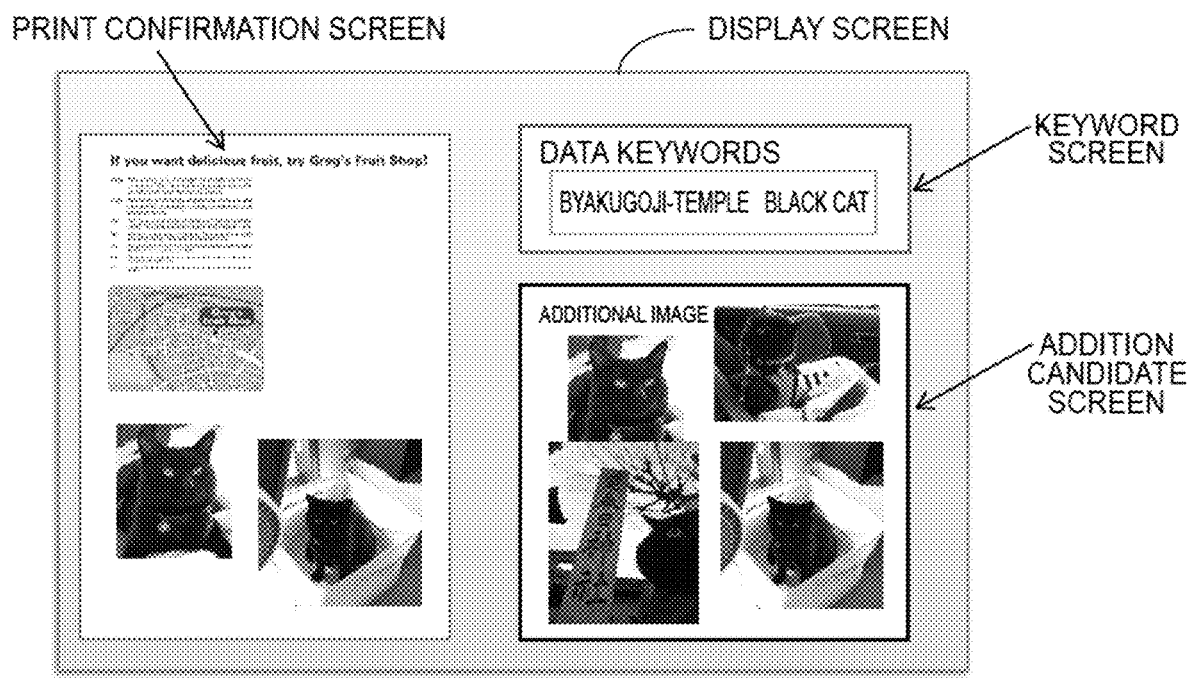

FIG. 8B illustrates an embodiment of a specific display screen corresponding to FIG. 6A.

If the user checks the additional related information 56 (image 2) displayed in the blank area 82 and wants to change the location, size, and the like of the image 2, the user may perform a predetermined input operation to change the location, size, and the like of the image 2.

Only one related candidate information 55 may be selected as the additional related information 56, but two or more pieces of related candidate information 55 may be selected in correspondence to the size or shape of the blank area 82.

When the selection of the additional related information 56 ends, the user generates a combined image to be printed on the printing sheet and displays the combined image on the display screen 70 by performing a predetermined input operation for checking the image to be printed.

FIG. 6B illustrates an embodiment of a display screen on which the generated combined image 83 is displayed. The user determines whether or not printing may be executed by checking the combined image 83.

If the checked combined image 83 may be printed, the user starts printing by performing an input operation implying the start of predetermined printing.

As a result, the combined image is printed on the printing sheet 84 as illustrated in FIG. 6C.

Figure 9:
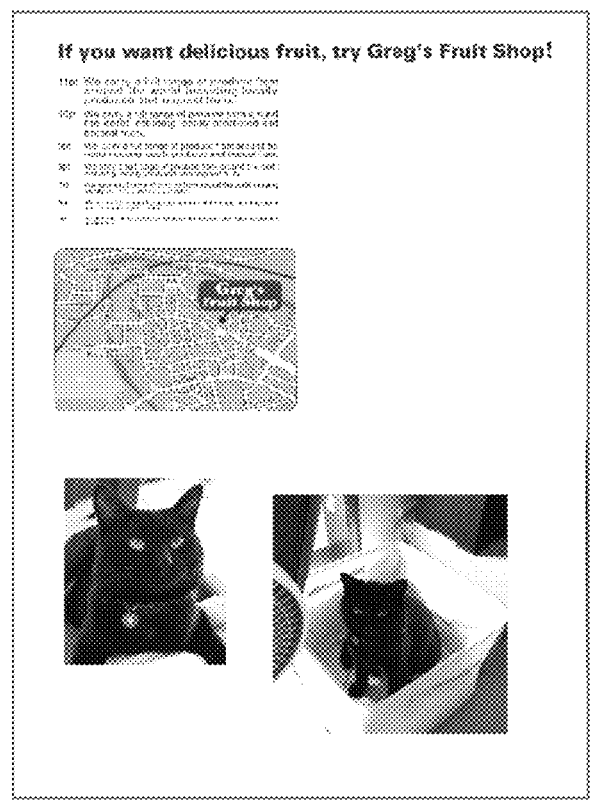
FIG. 9 is an explanatory diagram of an embodiment of a combined image printed on a printing sheet.

FIG. 9 illustrates an embodiment of a specific print image corresponding to FIG. 6C.

Alternatively, instead of printing the combined image 83, the user may perform an input operation for storing the combined image 83 in a predetermined storage medium, or an input operation for sending the combined image 83 to the server SV or the information processing device PC.

First Embodiment: Description of Process for Selecting and Adding Related Information of Print Information and then Printing the Same FIG. 10 illustrates a flowchart of an embodiment of a process for selecting and adding related information, and then printing a combined image.

Here, if print information is to be printed and the print information has a blank area, a process for acquiring the related candidate information related to the print information, selecting a desired related information (additional related information), and then combining the additional related information with the print information and printing on a printing sheet will be described.

Figure 10:
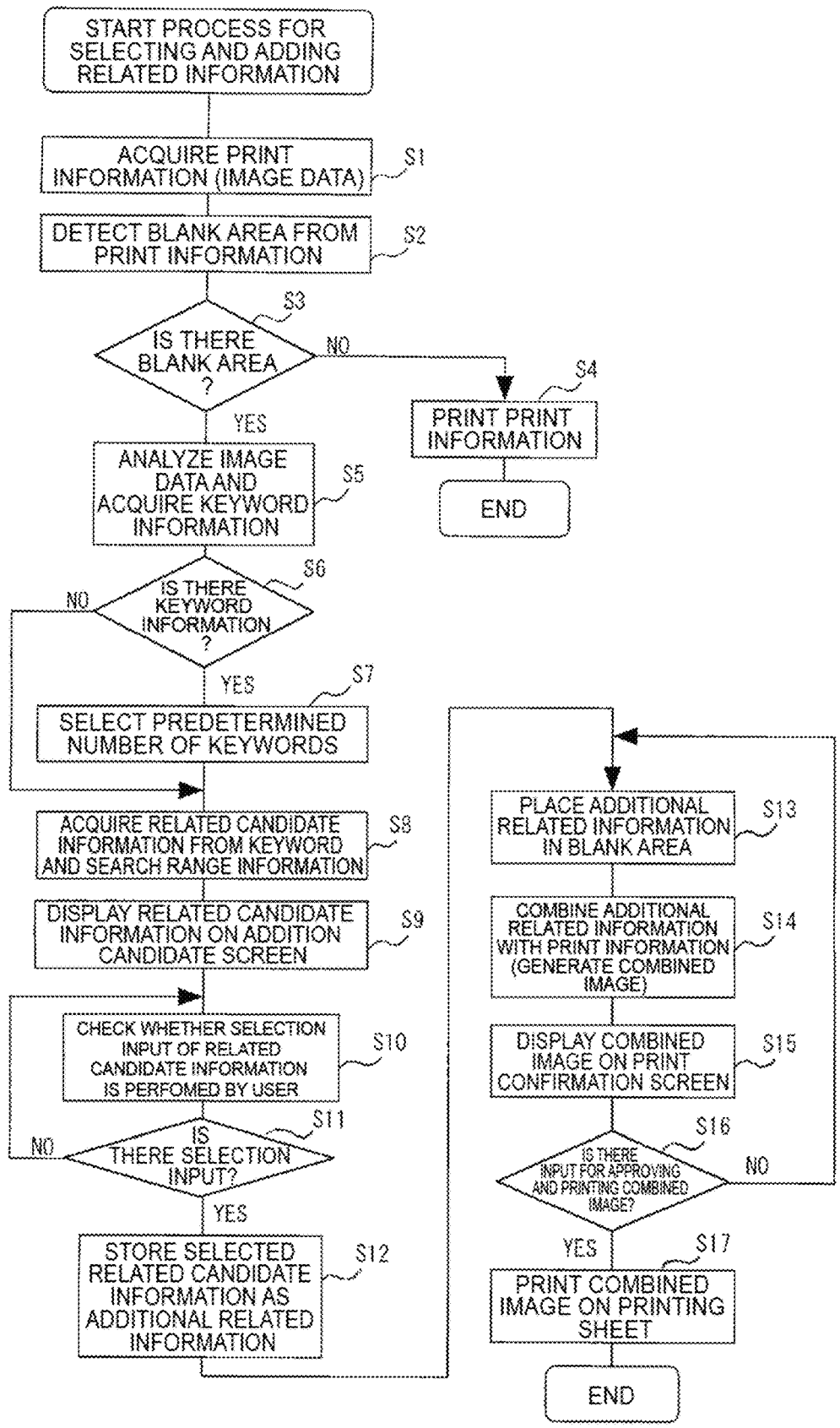
FIG. 10 is a flowchart of an embodiment of a process for selecting and adding related information, and then printing a combined image in the present invention.

In step S1 of FIG. 10, the print information acquirer 21 acquires print information (image data).

As described above, the print information may be acquired by scanning with a scanner, reading from a storage medium, receiving from a server SV or an information processing apparatus PC, or any other similar method.

The acquired print information 51 is stored in the storage 50 and displayed on the print confirmation screen of the display 13.

For example, as illustrated in FIG. 7A, the acquired print information is displayed on the print confirmation screen 71.

In step S2, the blank area detector 23 detects a blank area from the acquired print information 51.

As described above, a blank area having a predetermined size or more is detected, and information indicating the location of the blank area in the print information is stored as the blank area information 52.

If a blank area Is detected in step S3, the processing proceeds to step S5, and if a blank area is not detected, the processing proceeds to step S4.

In step S4, the acquired print information is printed by the screen outputter 16, and processing ends.

In step S5, the print information analyzer 22 analyzes the print information (image data), and the keyword acquirer 25 acquires the keyword information 54 from the analysis result and stores the information.

Further, for example, as illustrated in FIG. 7B, the acquired keyword is displayed on the keyword screen 72.

Figure 12:
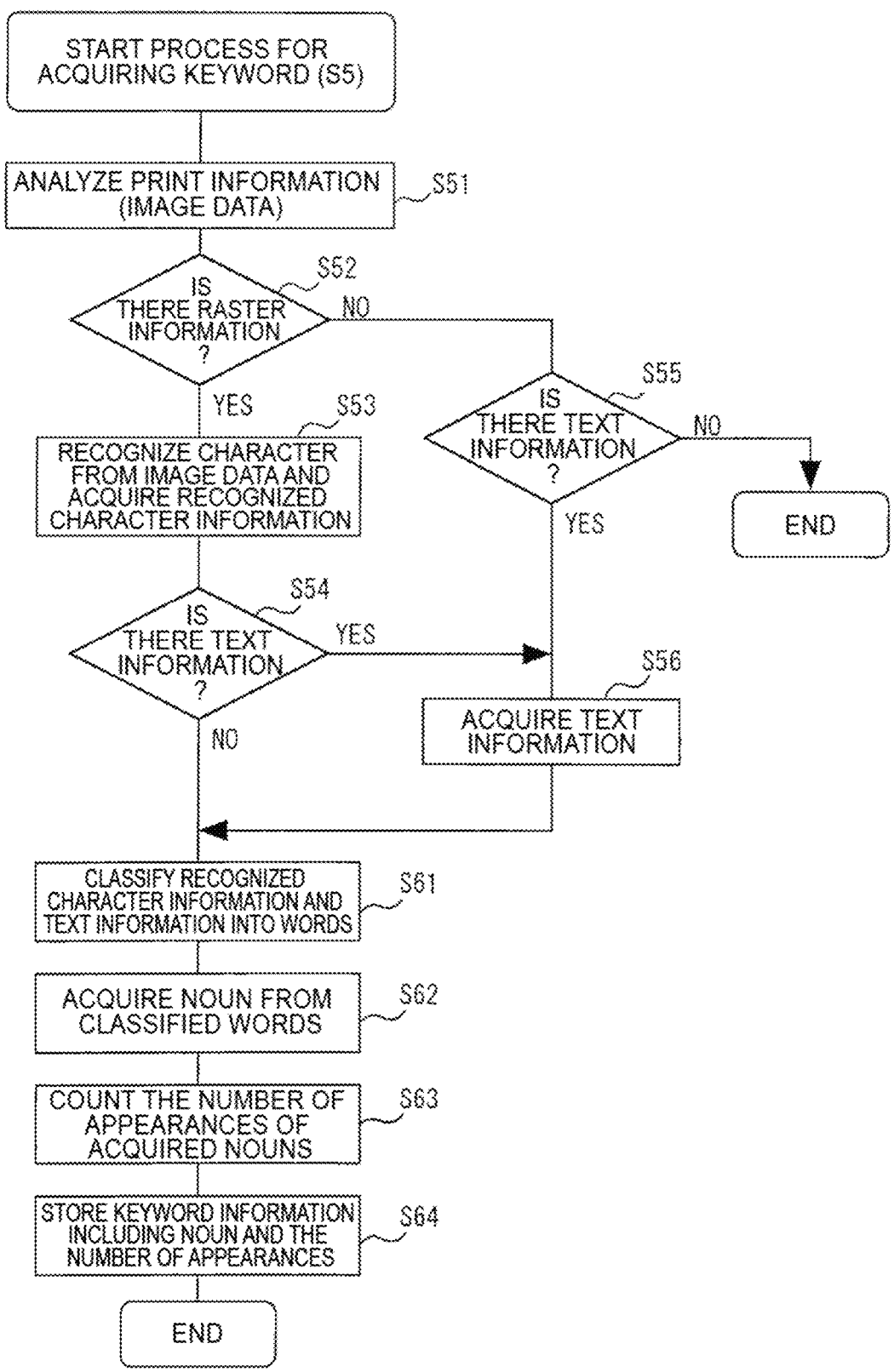
FIG. 12 is a flowchart of an embodiment of a process for acquiring keyword information in the present invention.

The details of analysis of the print information (image data) and the process for acquiring the keyword information in step S5 are illustrated in FIG. 12.

If the keyword information is acquired in step S6, the processing proceeds to step S7.

If the keyword information is not acquired, the processing may either proceed to step S8, or it may be displayed that the keyword information could not be acquired, and a screen for requesting the user to input, a keyword may be displayed.

In step S7, a predetermined number of keywords are displayed, the user is asked to select a keyword or edit the keywords to be used for the search, and thus a keyword is confirmed.

As illustrated in FIG. 7B, the confirmed keyword is also displayed on the keyword screen 72.

Figure 13:
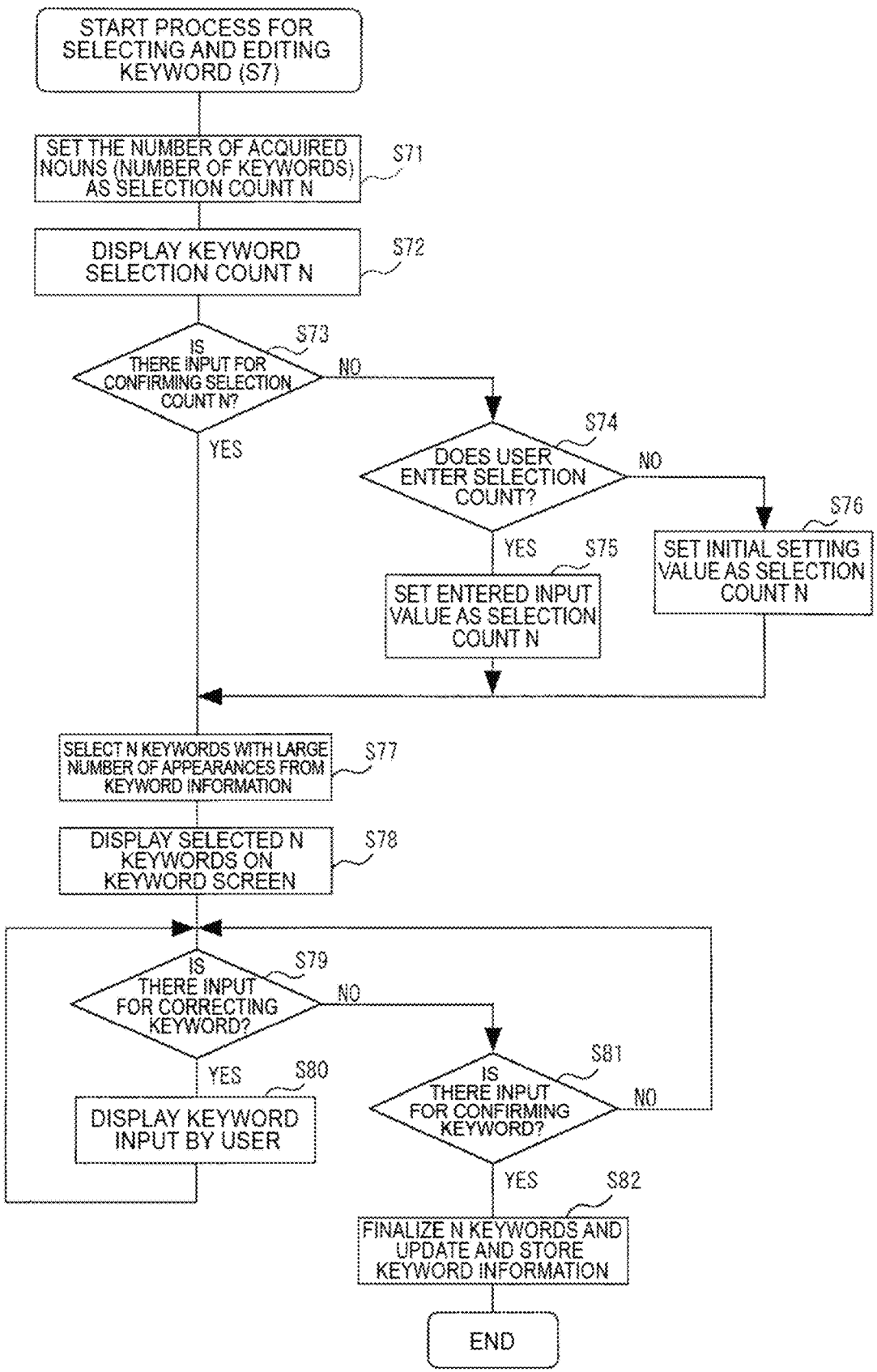
FIG. 13 is a flowchart of an embodiment of a process for selecting and editing keyword information in the present invention.

The details of the process for selecting and editing a keyword are illustrated in FIG. 13.

In step S8, the related candidate information acquirer 26 acquires and stores the related candidate information 55 using the confirmed keyword and the search range information 58.

Figure 14:
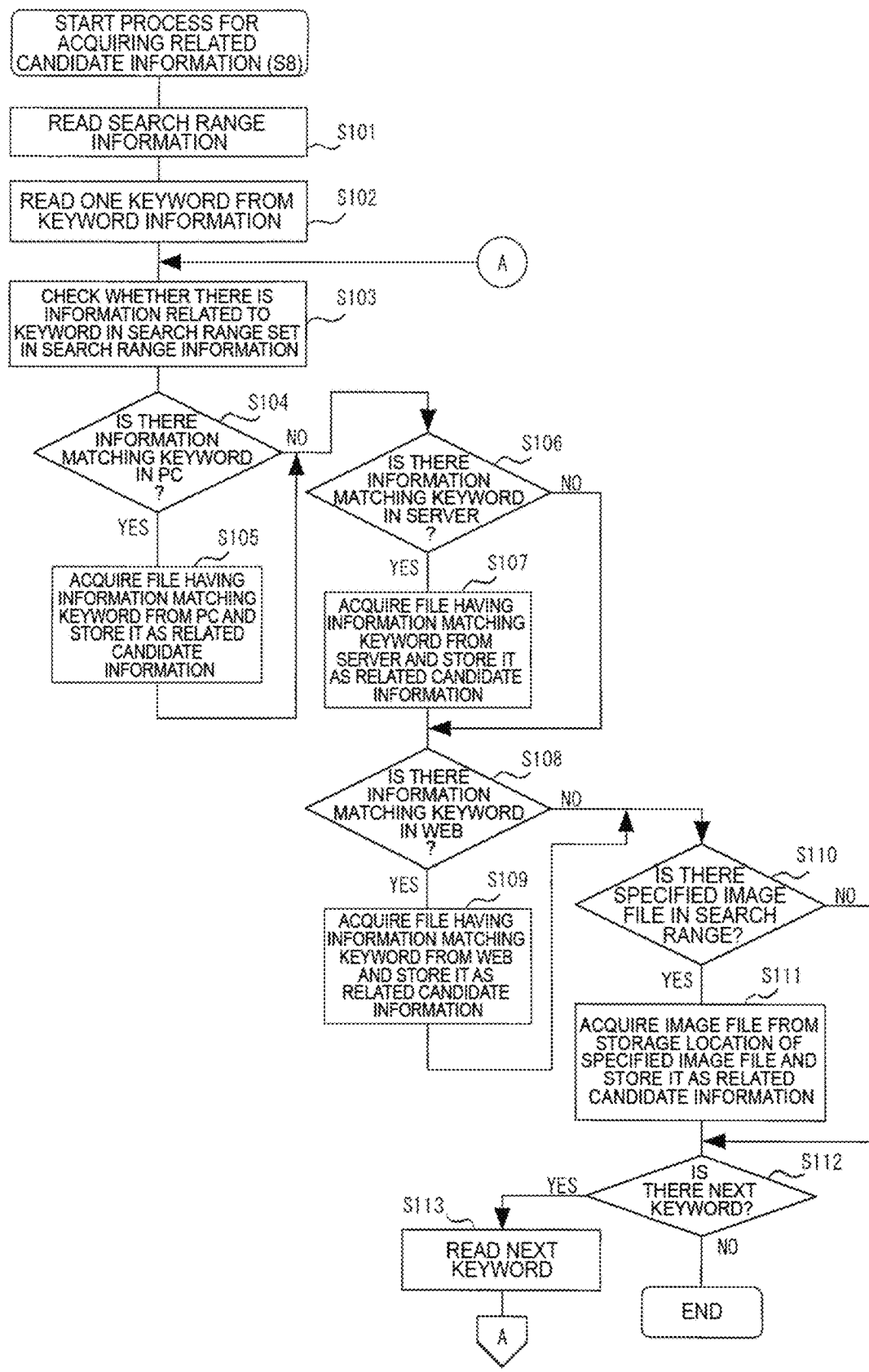
FIG. 14 is a flowchart of an embodiment of a process for acquiring related candidate information in the present invention.

The details of the process for acquiring related candidate information are illustrated in FIG. 14.

However, if there is no keyword information, the related candidate information may be acquired at random from the search range using the search range information 58 regardless of whether or not there is a relationship with the print information.

Alternatively, if the user enters a keyword, the related candidate information is acquired using the entered keyword and the search range information 58.

A range set in advance as an initial value, or a range specified by the user may be used for the search range information 58.

Figure 11:
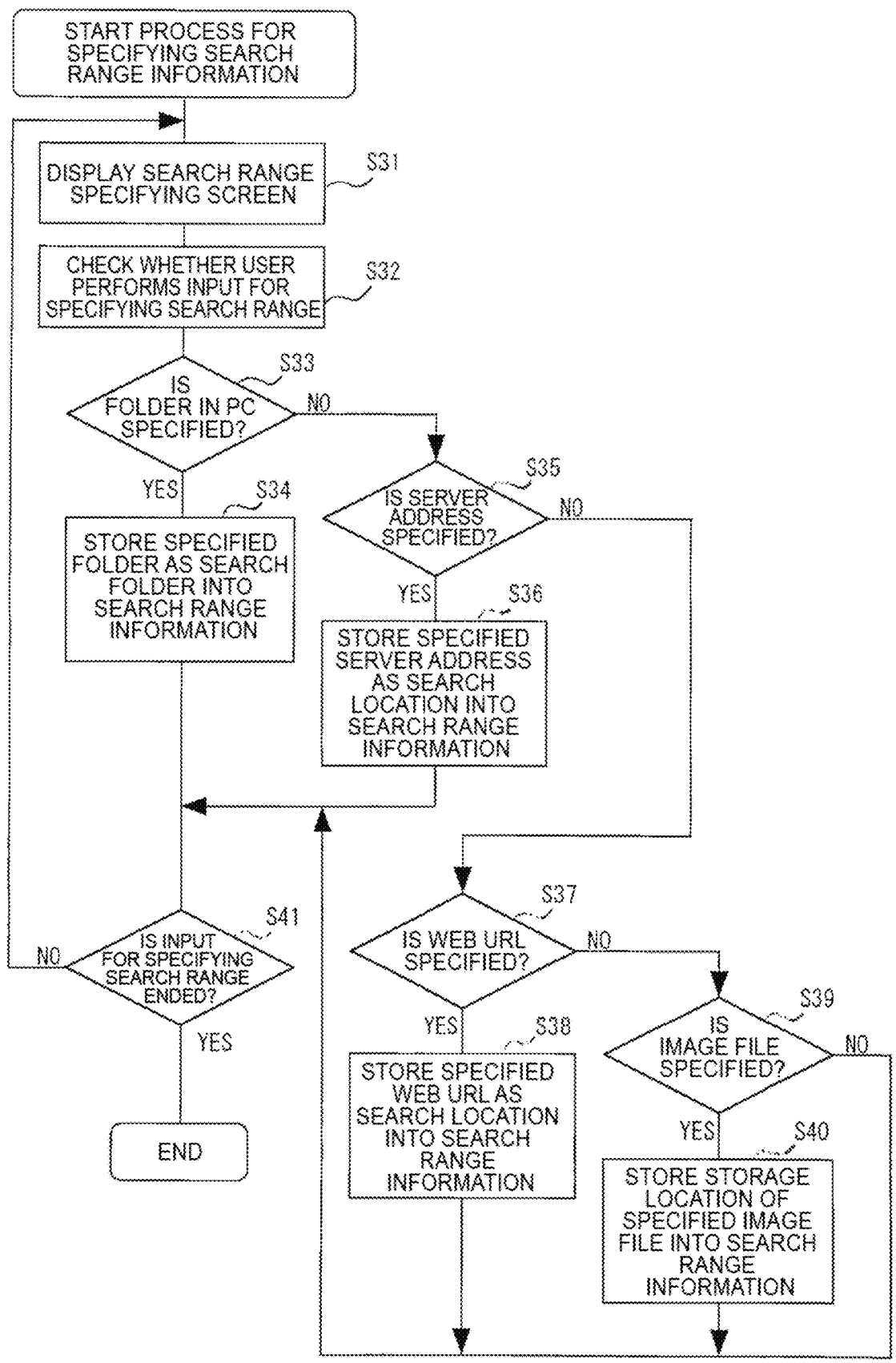
FIG. 11 is a flowchart of an embodiment of a process for specifying a search range for acquiring related information in the present invention.

The details of the process for specifying the search range information are illustrated in FIG. 11.

In step S9, the acquired related candidate information 55 is displayed on the addition candidate screen.

The acquired related candidate information 55 is, for example, as illustrated in FIG. 8A, displayed on the addition candidate screen 73.

The user checks the displayed related candidate information 55, and performs an input operation for selecting the information (additional related information) to be added to the blank area of the print information.

In step S10, whether the user performs an input for selecting related candidate information 55 is checked.

In step S11, if the user performs an input operation for selecting related candidate information 55, the processing proceeds to step S12, and if not, the processing returns to step S10.

In step S12, the selected related candidate information 56 is stored as additional related information 56.

In step S13, the related information combiner 27 arranges the additional related information 66 in the blank area of the print information.

If the size and location of the additional related information 56 have been specified by the user, the additional related information 56 is arranged at the specified location in the specified size.

In step S14, the related information combiner 27 generates an image (combined image information 57) in which the additional related information 56 has been combined with the print information.

In step S15, the combined image is displayed on the print confirmation screen 71.

For example, as illustrated in FIG. 8B, the combined image is displayed on the print confirmation screen 71.

Further, to check the detailed print, state before printing, a screen showing only a state where the combined image is printed on a set printing sheet may be displayed.

The user checks the combined image displayed on the print confirmation screen 71, and if there is no problem with the combined image, performs an input operation implying approval and execution of printing.

If, in step S16, an input is performed that implies approval and execution of printing, the processing proceeds to step S17.

However, rather than the input implying approval and execution of printing, if an input, for correcting the displayed combined image is performed, the processing returns to step S13 to change the arrangement, and the like of the additional related information 56, and the processes of from step S13 to step S15 described above are repeated.

In step S17, the combined image printing processor 28 prints the combined image on the printing sheet.

For example, as illustrated in FIG. 9, the combined image is printed on the printing sheet.

FIG. 11 illustrates a flowchart of an embodiment of a process for specifying a search range for acquiring the related information.

In step S31 of FIG. 11, a screen for specifying the search range is displayed.

For example, as illustrated in FIGS. 3A and 3B, the search range screen 74 is displayed on the display screen.

As illustrated in FIGS. 3A and 3B, if the options of the search range are displayed on the search range screen 74, the user performs an input for specifying the desired search range.

If checkboxes are displayed as illustrated in FIGS. 3A and 3B, an input for checking a checkbox may be performed.

Alternatively, if the detailed contents of the search range are to be specified, for example, a folder, an address, or a file name may be input.

In step S32, whether the user performs an input for specifying the search range is checked.

In step S33, if there is an input for specifying a folder in the information processing device PC among the user inputs for specifying the search range, the processing proceeds to step S34, and if not, the processing proceeds to step S35.

In step S34, the specified folder in the PC is stored in the search range information 58 as the search folder.

After step S34, the processing proceeds to step S41, and If there is no input to end the input for specifying the search range, the processing returns to step S31, and if there is an input to end the input for specifying the search range, the processing ends.

Moreover, in step S32, the user may have performed an input for specifying a plurality of search ranges (checkboxes), and therefore, in step S41, whether the user performs an input for specifying another search range is checked, and if there are any remaining unchecked search ranges, the processing returns to step S33, and the check for specifying the search range may be repeated. In this case, if there is no remaining unchecked search range, whether the user performs an input for ending an input for specifying the search range may be checked.

In step S35, if there is aw input for specifying an address of a server SV among the user inputs for specifying the search range, the processing proceeds to step S36, and if not, the processing proceeds to step S37.

In step S36, the specified address of the server SV is stored in the search range information 58 as a search location.

Thereafter, the processing proceeds to step S41.

In step S37, if there is an input for specifying a WEB URL among the user inputs for specifying the search range, the processing proceeds to step S38, and if not the processing proceeds to step S39.

In step S38, the specified WEB URL is stored in the search range information 58 as a search location.

Thereafter, the processing proceeds to step S41.

In step S39, if there is an input for specifying an image file among the user inputs for specifying the search range, the processing proceeds to step S40, and if not, the processing proceeds to step S41.

In step S40, the storage location of the specified image file is stored in the search range information 58.

Thereafter, the processing proceeds to step S41.

In FIG. 11, an information processing device PC, a server SV, a WEB, and an image file are illustrated as the search range, but the search range is not limited to these, and if another search range is specified, the specified search range may be stored in the search range information 58.

If a search range that is the initial value is preset in the search range information 58, the initial-value search range is displayed on the search range screen 74, and if the user desires to employ the initial-value search range, the user may not perform the input for specifying the search range.

FIG. 12 illustrates a flowchart of an embodiment of a process for acquiring the keyword information.

The process is the process performed in step S5 described above.

In step S51, the print information analyzer 22 analyzes the print information (image data) and mainly checks whether the print information includes text information or raster information.

In step S52, if a raster area containing raster information exists, the processing proceeds to step S53, and if not, the processing proceeds to step S55.

In step S55, if a text area containing text information exists, the processing proceeds to step S56, and if not, the process for acquiring the keyword information ends.

In step S56, because a text area exists, the text information included in the text area is acquired and stored.

In step S53, the character recognizer 24 performs character recognition from the print information (image data) to acquire and store the recognized character information 53.

In step S54, as in step S55, if a text area containing text information also exists, the processing proceeds to step S56, where the text information included in the text area is acquired and stored as recognized character information 53.

However, if a text area containing text information does not exist in step S54, the processing proceeds to step S61.

In step S61, the acquired recognized character information 53 and the text information in the text area are classified into words.

In step S62, noun words are acquired from the classified words.

The acquired noun words are keywords.

In step S63, the number of appearances of the acquired noun words are counted.

Since the same noun may appear multiple times in the print information, the number of times that the noun appears (the number of appearances) is counted.

In step S64, the keyword acquirer 25 stores, in the storage 50, the keyword information 54 including the acquired noun words and the number of appearances thereof.

Thus, keywords included in the print information are acquired from the print information.

FIG. 13 illustrates a flowchart of an embodiment of the process for selecting and editing the keyword information.

The process is the process performed in step S7 described above.

In step S71 of FIG. 13, the number of nouns (number of keywords) acquired by the process for acquiring a keyword described above is set as the keyword selection count N.

In step S72, the keyword selection count N is displayed on the display 13.

The user confirms the displayed selection count N and checks whether or not this number is acceptable.

If there is no problem with the displayed selection count N, the user performs an input implying that the displayed selection count N has been confirmed, and if the user wants to change the displayed selection count N, the user performs an input for changing the selection count N.

Alternatively, a preset, initial setting value may beset as the selection count N.

In step S73, whether or not there is an input for confirming the selection count N is checked, and if there is an input for confirming the selection count N, the processing proceeds to step S77, and if not the processing proceeds to step S74.

In step S74, whether or not there is an input for setting the selection count N by the user is checked, and if the setting value of the selection count N has been entered, the processing proceeds to step S75, and if not the processing proceeds to step S76.

In step S75, the setting value entered by the user is set as the selection count N, and the processing proceeds to step S77.

In step S76, a preset initial setting value is set as the selection count N, and the processing proceeds to step S77.

In step S77, the number (N) of keywords corresponding to the selection count N is selected from the keyword information in the descending order of the number of appearances.

For example, if the selection count N is 2, two keywords are selected in the descending order of the number of appearances.

In step S78, the selected N number of keywords is displayed on the keyword screen 72.

The user checks the displayed N number of keywords, determines whether or not the selected keywords are appropriate, and if the selected keywords are inappropriate, performs an input, for example, for correcting the keywords, and if the selected keywords are appropriate, performs an input implying that the selected keywords have been confirmed.

In step S79, if there is an input, for example, for correcting the keywords, the processing proceeds to step S80, and if not, the processing proceeds to step S81.

In step S80, the keywords entered by the user are displayed, and the processing returns to step S79. The user input operations include, for example, deleting the keywords, changing the keywords, and adding a new keyword.

In step S81, if there is an input implying that the selected keywords have been confirmed, the processing proceeds to step S82, and if not, the processing returns to step S79.

In step S82, N number of keywords are confirmed, the keyword information 54 is updated and stored, and the processing ends.

Thus, the keywords to be used for the search are selected or the keywords are edited.

FIG. 14 illustrates a flowchart of an embodiment of a process for acquiring related candidate information.

The process is the process performed in step S8 described above.

In the flowchart of FIG. 14 illustrated below, information of the information processing device PC, the server SV, the WEB URL, and the storage location (link destination address) of the specified image file is set and stored in the search range information 58 as the search range, and the four search ranges is searched for information related to the keywords.

However, for example, if only the server SV is set in the search range information 58, only the server SV is searched for information related to the keywords, and the other search ranges are not searched.

In step S101 in FIG. 14, the related candidate information acquirer 26 reads the search range information 58.

In some cases, only a single search range may be set in tine search range information 58, and in the other cases, a plurality of search ranges may be set.

If a plurality of search ranges are set, a search process using the keywords is executed for each of the search ranges.

In step S102, one keyword is read from the acquired keyword information.

The read keyword is the search target, and the search range set in the search range information 58 is searched for information related to the keyword. Information related to the keyword implies, for example, file information having a file name matching the keyword, document information in which text information matching the keyword is provided, image information in which identification information matching the keyword is added, a URL of the Web page related to the keyword, and an address of the folder that stores the original electronic date to be printed.

In step S103, whether or not there is information related to the keyword in the search range set in the search range information 58 is checked. For example, whether or not there is information matching the keyword is checked.

As described above, whether or not there are file information, and the like having a file name matching the keyword is checked, and if the corresponding file information, and the like exist, the file information, and the like are acquired from the search range.

In step S104, if information matching the keyword exists in the information processing device PC that is the search range, the processing proceeds to step S105, and if not, the processing proceeds to step S106.

In step S105, the information file matching the keyword is acquired from the information processing device PC and stored as the related candidate information 55. Thereafter, the processing proceeds to step S106.

In step S106, if information matching the keyword exists in the server SV that is the search range, the processing proceeds to step S107, and if not, the processing proceeds to step S108.

In step S107, the information file matching the keyword is acquired from the server SV and stored as the related candidate information 55. Thereafter, the processing proceeds to step S108.

In step S108, if information matching the keyword exists in the WEB that is the search range, the processing proceeds to step S109, and if not, the processing proceeds to step S110.

In step S109, the information file matching the keyword is acquired from the WEB and stored as the related candidate information 55. Thereafter, the processing proceeds to step S110.

In step S110, if an image file specified as the search range exists, the processing proceeds to step S111, and if not, the processing proceeds to step S112.

In step S111, the image file is acquired from the storage location (link destination address) of the specified image file and stored as the related candidate information 55. Thereafter, the processing proceeds to step S112.

In step S112, whether or not there is a subsequent keyword not yet having been searched in the keyword information is checked and if there is a subsequent keyword not yet having been searched, the processing proceeds to step S113.

In step S113, one subsequent keyword is read the processing returns to step S103, and the above processing is repeated.

If there are no subsequent keywords not yet having been searched that is, if all the keywords included in the keyword information have been searched, the processing ends.

In this way, information related to the keywords included in the print information is automatically acquired from the set search range and stored as related candidate information to be added to the blank area of the print information, and therefore, the user need not search information to be added to the blank area of the print information, which simplifies the input work by the user and shortens the time taken for searching the related information to be added to the blank area, thus reducing the work burden of the user.

Second Embodiment: Process for Specifying Detection Range

The above-described embodiment in FIGS. 3A and 3B describes a case in which several preset search ranges are displayed on the display screen, and the user selects and inputs a desired search range. However, the specification of the search range is not limited thereto.

For example, the search range may be fixedly set in advance so that the user cannot change the search range.

Alternatively, one search range may be fixedly set in advance, and information that can be used as related candidate information by the user may be saved in advance in the fixed search range. For example, the search range may be set to a folder FD in a user-owned personal computer, and the user may store a large amount of information that can be used as related candidate information in this folder FD.

Alternatively, instead of selecting a preset search range, the user may directly input a specific search range. For example, the user may enter in advance the location of a personal computer in which the desired information is stored, or may enter the URL of a WEB where the desired information is stored.

In addition, the search range may be fixedly set in advance, or the user may set the search range in advance, and when the printing process is not performed, the preset search range may be accessed, the keywords related to each item of information that exists in the search range may be acquired from the information, link information in which the storage location of the information, the identification name of the information, and the acquired keyword related to the information are associated with each other may be created, and a plurality of pieces of link information may be stored in advance as the range to be searched for the related candidate information.

For example, if a user-owned personal computer is set in advance as the search range, then when the printing process is not performed, a plurality of pieces of information files stored in the personal computer may be accessed, words included in the file name of each of the information files may be acquired as the keywords, link information in which the storage location of the information file (for example, a folder), the file name of the information file, and the acquired keyword are associated with each other (for example, the storage location of the information file=a photograph folder, the file name of the information file=Hokkaido photograph 001, the keywords=Hokkaido) may be created for each of the information files, and a plurality of pieces of link information may be stored as the range to be searched for the related candidate information.

In this case, the keyword information acquired from the print information Is compared with the keywords of the link information, and if a keyword matching the keyword information is found in the link information, the storage location of the information file associated with the matching keyword is accessed, and the information file at the storage location is acquired as the related candidate information.

If "storage location=photograph folder, file name=Hokkaido photograph 001, keyword=Hokkaido" is stored in the link information, and "Hokkaido" is included in the keyword information acquired from the print information, the information file (Hokkaido photograph 001) at the storage location (photograph folder) of the link information having the keyword matching the keyword information "Hokkaido" is acquired as the related candidate information.

In this way, instead of fixedly setting the search range, the search range can be set flexibly through selection and input by the user, or by making the settings in advance, and thus, the possibility of acquiring related candidate information with a relatively high association with the print information can be increased.

Third Embodiment: Process for Editing Keyword

In the embodiments described above, keywords are acquired from the print information, the acquired keywords are displayed on the keyword screen, and the user edits the displayed keywords.

During the editing of keywords, it is preferable that the user can delete, partially correct, or change the displayed keywords, or add a new keyword.

In addition, since the number of keywords that can be displayed on the keyword screen is limited, the number of keywords that can be displayed on the keyword screen may be selected and displayed in the descending order of the number of appearances of the keyword from the acquired keywords. When keywords are selected in the descending order of the number of appearances, the possibility of acquiring related candidate information with a relatively high association with the print, information increases.

On the other hand, if no keywords have been acquired, the user may be requested to enter a keyword by displaying on the display screen that a keyword needs to be entered.

In addition, if the number of acquired keywords is much larger than the number of keywords that can be displayed on the keyword screen, it may be displayed that keywords other than those displayed have been acquired, and by performing a predetermined input operation, all the acquired keywords may be displayed on the display screen, so that the user may be able to select a keyword to be employed.

When a keyword is acquired in addition to the number of appearances of the keyword, the character size, color, and the like of the keyword provided in the print information may be also acquired as information accompanying the keyword. Further, information regarding whether or not decorations such as an underline, italics, a bold and a strikethrough have been specified for the characters included in the keywords may be acquired as information accompanying the keyword.

For example, since a keyword with a large character size can be considered as an important keyword in the print information, a keyword may be selected in the descending order of the number of appearances, but if there are a plurality of keywords with the same number of appearances, a keyword with the larger size may be selected preferentially.

As for the color of the keyword a keyword specified in a visible color such as red may be selected preferentially.

In this way, when not only the number of appearances of a keyword but also the size, the color, and the like of a keyword are considered and the keyword to be used for the search may be selected possibility of acquiring related information with a relatively high association with the print information can be increased.

Fourth Embodiment: Process for Setting Number of Keywords

If the number of keywords acquired from the print information is too small, it may be difficult to acquire the appropriate related candidate information, and furthermore, if the number of keywords to be acquired is too large, an extremely large number of related candidate information may be acquired, because of which it may take time for the user to select the desired related candidate information from the related candidate information.

Therefore, to ensure that the number of keywords acquired is not too large, either the number of keywords to be acquired (keyword acquisition count K0) may be set, or an upper limit number may be set. For example, a number (for example, three) determined by considering the size of the keyword screen may be fixedly set as the keyword acquisition count K0.

Alternatively, the user may arbitrarily set and change the keyword acquisition count K0.

For example, if the number of acquired keywords is K, 50% the keywords (0.5×K) may be dynamically set as the keyword acquisition count K0.

Here, the numerical value of 50% is merely an example, and other arbitrary numerical values may be employed.

Thus, when tire number of keywords to be acquired is set by any of fixed setting, change in the setting by the user, or dynamic setting, it is possible to acquire an appropriate number of pieces of related candidate information.

DESCRIPTION OF REFERENCE NUMERALS

1 Image forming apparatus (MFP),
2 Network,
3 Server,

4 Information processing device,
11 Controller,
12 Operation processor,
13 Display,
14 Communicator,
15 Image former,
16 Image outputter,
21 Print information acquirer,
22 Print information analyzer,
23 Blank area detector,
24 Character recognizer,
25 Keyword acquirer,
26 Related candidate information acquirer,
27 Related information combiner,
28 Combined image printing processor,
50 Storage,
51 Print information,
52 Blank area information,
53 Recognized character information,
54 Keyword information,
55 Related candidate information,
56 Additional related information,
57 Combined image information,
58 Search range information,
70 Display screen
71 Print confirmation screen,
72 Keyword screen,
73 Addition candidate screen,
74 Search range screen,
75 Number of search words,
81 Print data
82 Blank area,
83 Combined image,
84 Printing sheet

What is claimed is:

1. An image forming apparatus, comprising:
an operation processor with which a user performs a predetermined input operation;
a print information acquirer that acquires print information;
a blank area detector that detects a blank area included in the print information acquired;
a keyword acquirer that acquires a predetermined number of keywords from text information included in the print information acquired;
a related candidate information acquirer that acquires related candidate information related to the predetermined number of keywords acquired from a search range preset in predetermined search range information;
a related information combiner that generates a combined image in which related information selected using the operation processor from the related candidate information acquired is combined with the blank area of the print information acquired; and
a combined image printing processor that prints the combined image generated on a predetermined printing sheet.

2. The image forming apparatus according to claim 1, further comprising: a print information analyzer that analyzes the print information and classifies the print information into a character area in which text information is provided and a raster area in which image information is provided;
a character recognizer that extracts text information from the image information included in the raster area; and
a storage that stores the text information in the character area and the text information extracted as recognized character information.

3. The image forming apparatus according to claim 2, wherein
the keyword acquirer divides the text information included in the recognized character information into words, recognizes a part of speech of each of the words, and acquires noun words, based on the part of speech recognized as keywords.

4. The image forming apparatus according to claim 2, wherein
the keyword acquirer counts a number of appearances in the print information for each of the keywords acquired, and stores, in the storage, keyword information in which the keywords acquired are associated with the number of appearances.

5. The image forming apparatus according to claim 4, wherein
if a plurality of the keywords are acquired, the keyword acquirer selects a predetermined number of keywords in descending order of the number of appearances, and stores the predetermined number of keywords in the storage.

6. The image forming apparatus according to claim 5, wherein the predetermined number of keywords to be selected is set by the user using the operation processor.

7. The image forming apparatus according to claim 1, further comprising: a display, wherein
a display screen of the display includes a print confirmation screen displaying the print information and an addition candidate screen displaying the related candidate information acquired, and
if an operation of arranging desired related information selected by the user from the related candidate information displayed on the addition candidate screen in the blank area of the print information displayed on the print confirmation screen is performed by the operation processor,
the related information combiner generates a combined image in which the desired related information selected is combined with the blank area of the print information.

8. The image forming apparatus according to claim 7, wherein the keywords acquired are displayed on die display so that the user performs editing of the keywords displayed using the operation processor.

9. The image forming apparatus according to claim 8, wherein the editing of the keywords includes deleting the keywords, changing the keywords, and adding a keyword.

10. The image forming apparatus according to claim 1, wherein a location and a device configured to search the related candidate information related to the keywords are set in the search range information, and at least one or more devices from an information management device in which a plurality of pieces of information are stored, an information processing device owned by the user, and a storage device are included in the search range information.

11. The image forming apparatus according to claim 10, wherein the search range information is set by the user using the operation processor.

12. The image forming apparatus according to claim 1, further comprising: an image outputter that outputs the combined image generated, wherein
the image outputter stores the combined image in a predetermined storage medium, or sends the combined image to an information management device in which a plurality of pieces of information are stored.

13. The image forming apparatus according to claim 1, wherein the blank area is an area in which no information is provided, and is an area having a size equal to or larger than a predetermined area dimension.

14. The image forming apparatus according to claim 1, wherein the print information includes information provided in a document scanned by an image scanning device, information stored in a storage medium, and information sent from an information management device in which a plurality of pieces of information are stored.

15. A print information generation method in an image forming apparatus, comprising:
   acquiring print information by a user predetermined input operation;
   detecting a blank area included in the print information acquired;
   acquiring a predetermined number of keywords from text information included in the print information acquired;
   acquiring related candidate information related to the predetermined number of keywords acquired from a search range preset in predetermined search range information;
   generating a combined image in which the related information selected by a user predetermined input operation from the related candidate information acquired is combined with the blank area of the print information acquired; and
   printing the combined image generated on a predetermined printing sheet.

16. A print information generation method in an image forming apparatus, comprising:
   acquiring print information by a user predetermined input operation;
   displaying the print information acquired on a print confirmation screen;
   detecting a blank area included in the print information acquired;
   acquiring a predetermined number of keywords from text information included in the print information acquired;
   acquiring related candidate information related to the predetermined number of keywords acquired from a search range preset in predetermined search range information;
   displaying the related candidate information acquired on an addition candidate screen;
   upon selecting desired related information by the user from the related candidate information displayed and performing an operation of arranging the related information selected in the blank area of the print information displayed on the print confirmation screen, generating a combined image in which the related information selected is combined with the blank area of the print information acquired; and
   printing the combined image generated on a predetermined printing sheet.

* * * * *